(12) United States Patent
Rouxel

(10) Patent No.: US 12,048,277 B2
(45) Date of Patent: Jul. 30, 2024

(54) PRESERVATION MODE FOR PLANT-GROWING SYSTEM

(71) Applicant: Gardyn Inc., Bethesda, MD (US)

(72) Inventor: Francois-Xavier Rouxel, Bethesda, MD (US)

(73) Assignee: Gardyn Inc., Bethesda, MD (US)

( * ) Notice: Subject to any disclaimer, the term of this patent is extended or adjusted under 35 U.S.C. 154(b) by 148 days.

(21) Appl. No.: 17/304,822

(22) Filed: Jun. 25, 2021

(65) Prior Publication Data

US 2021/0400892 A1 Dec. 30, 2021

Related U.S. Application Data

(60) Provisional application No. 63/044,987, filed on Jun. 26, 2020.

(51) Int. Cl.
*A01G 31/06* (2006.01)
*A01G 7/04* (2006.01)
*F21V 23/00* (2015.01)

(52) U.S. Cl.
CPC .............. *A01G 31/06* (2013.01); *A01G 7/045* (2013.01); *F21V 23/003* (2013.01)

(58) Field of Classification Search
CPC ........ A01G 31/06; A01G 31/02; A01G 7/045; A01G 27/003
See application file for complete search history.

(56) References Cited

U.S. PATENT DOCUMENTS

| | | | |
|---|---|---|---|
| 9,829,871 B1 * | 11/2017 | Goodman | A01G 25/167 |
| 10,271,474 B1 * | 4/2019 | Miller | A01G 25/06 |
| 10,803,312 B2 | 10/2020 | Genty et al. | |
| 10,806,095 B2 * | 10/2020 | Onac | A01G 9/20 |
| 11,538,099 B2 * | 12/2022 | Greenberg | G06Q 20/12 |
| 2019/0082610 A1 * | 3/2019 | Speer | H05B 47/155 |
| 2019/0191643 A1 | 6/2019 | Chan et al. | |
| 2020/0344965 A1 * | 11/2020 | Song | G06T 7/0004 |

FOREIGN PATENT DOCUMENTS

| | | |
|---|---|---|
| CN | 110959432 A | 4/2020 |
| EP | 2823703 A1 | 1/2015 |
| KR | 101979258 B1 | 5/2019 |
| WO | WO 2021-263154 A1 | 12/2021 |

OTHER PUBLICATIONS

International Search Report and Written Opinion for International Application No. PCT/US2021/039172, mailed on Oct. 13, 2021, in 43 pages.

\* cited by examiner

*Primary Examiner* — Monica L Perry
*Assistant Examiner* — Katherine Anne Kloecker
(74) *Attorney, Agent, or Firm* — Knobbe, Martens, Olson & Bear, LLP

(57) ABSTRACT

A plant-growing system includes a planting system configured to hold one or more plants, a lighting system including a light source configured to emit light, a watering system configured to communicate liquid to the planting system, or a controller communicatively coupled with the lighting system or the watering system. The controller operates in a plant-growing mode during a first period and operate in a plant-preservation mode during a second period. In the plant-preservation mode, the controller controls the lighting system and the watering system to cause the one or more plants to grow more slowly than in the plant-growing mode.

20 Claims, 8 Drawing Sheets

PRESERVATION MODE FOR PLANT-GROWING SYSTEM

CROSS-REFERENCE TO RELATED APPLICATIONS

The present application claims priority benefit to U.S. Provisional Application No. 63/044,987, filed Jun. 26, 2020, entitled "Plant Preservation Mode," which is hereby incorporated herein by reference in its entirety. Any and all applications for which a foreign or domestic priority claim is identified in the Application Data Sheet as filed with the present application are incorporated by reference under 37 CFR 1.57 and made a part of this specification.

The concepts described in this application are compatible with and can be used in conjunction with any combination of the embodiments or features described in International Patent Publication No. WO 2020/076729 (the '729 publication), filed Oct. 7, 2019, entitled "Plant Growth Container," the disclosure of which is hereby incorporated herein by reference in its entirety for all purposes. Some or all of the features described below can be used or otherwise combined together with any of the features described in the '729 publication.

FIELD

The present disclose generally relates to horticultural methods, systems, and apparatuses. More particularly, in several cases, the present disclosure relates to plant-growing systems in which plants grow without soil.

BACKGROUND

Techniques have been developed for growing plants without soil by utilizing mineral or bio-derived nutrient solutions in a water solvent. These techniques can provide a means of indoor or outdoor cultivation; however, they give rise to technical challenges relating to efficient utilization of energy and water.

SUMMARY

The systems, methods, and devices of this disclosure each have several innovative aspects, no single one of which is solely responsible for the all of the desirable attributes disclosed herein.

A plant-growing system includes a planting system configured to hold one or more plants, a lighting system including a light source configured to emit light, a watering system configured to communicate liquid to the planting system, or a controller communicatively coupled with the lighting system or the watering system. The controller operates in a plant-growing mode during a first period and operates in a plant-preservation mode during a second period. In the plant-preservation mode, the controller controls the lighting system and the watering system to cause the one or more plants to grow more slowly than in the plant-growing mode.

In the plant-growing mode, the controller controls the lighting system to provide a first quantity of first distinct lighting periods within a block of time. In the plant-preservation mode, the controller controls the lighting system to provide a second quantity of second distinct lighting periods within the block of time. In some cases, each of the first distinct lighting periods and the second distinct lighting periods includes an activation of the lighting system and a deactivation of the lighting system, each of the first lighting periods is longer in duration than each of the second lighting periods, each of the first lighting periods has a higher duty cycle than each of the second lighting periods, the first quantity is fewer than the second quantity, or an average intensity of light during the first distinct lighting periods, when the lighting system is active, is lower than an average intensity of light during the second distinct lighting periods, when the lighting system is active.

Although certain examples are disclosed herein, inventive subject matter extends beyond the examples disclosed to other alternative examples or uses, and to modifications and equivalents thereof.

BRIEF DESCRIPTION OF THE DRAWINGS

These drawings and the associated description herein are provided to illustrate specific embodiments and are not intended to be limiting.

DETAILED DESCRIPTION

Figure 1:
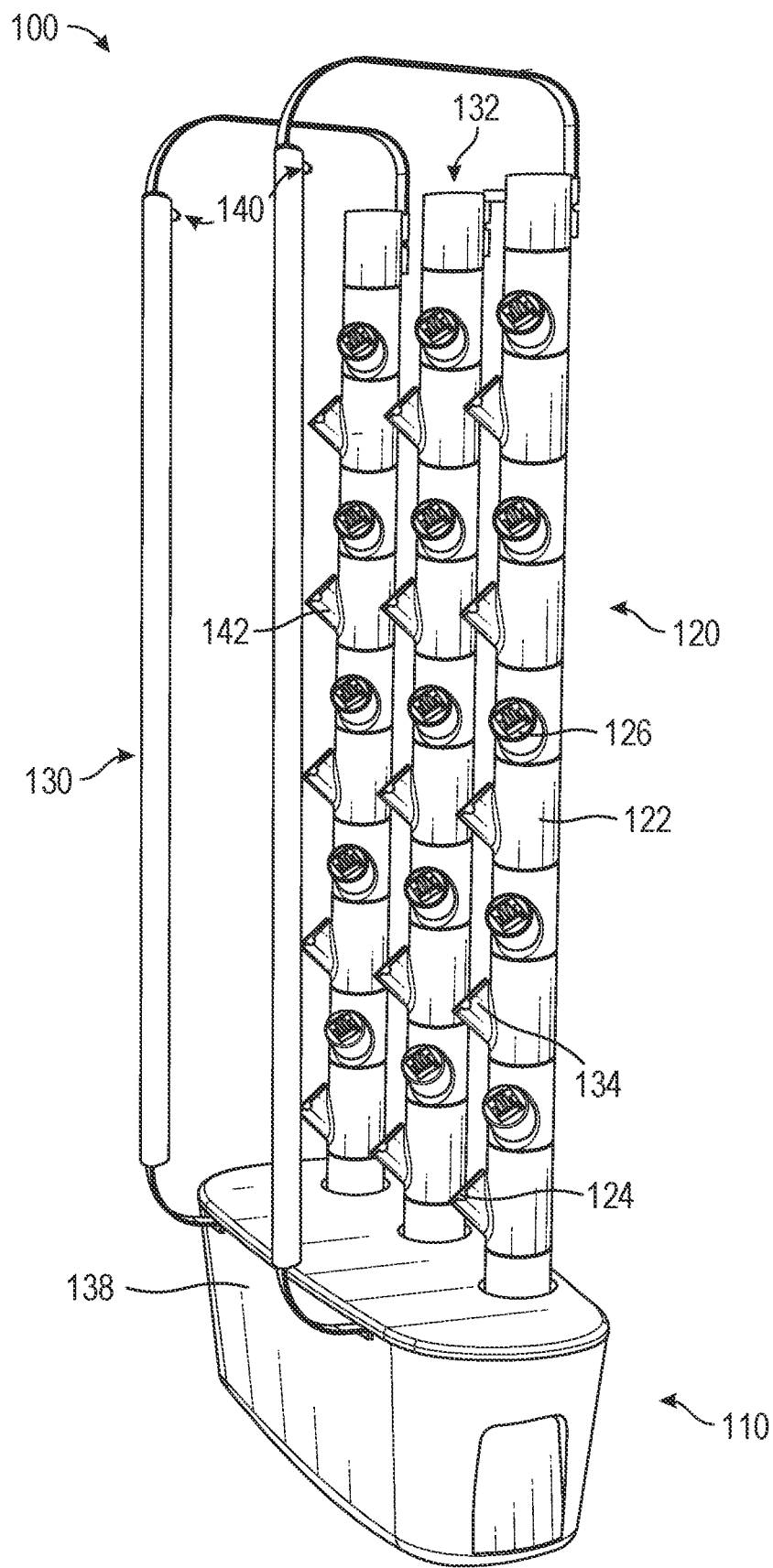
FIG. 1 illustrates a perspective view of an example plant-growing system, in accordance with some examples.

Plant-growing systems and methods described herein can provide systems, devices, and techniques for growing, managing, or maintaining plants. A variety of plant-growing systems, devices, and methods is described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No feature, structure, or step disclosed herein is essential or indispensable.

Considerable time and research has been devoted to the development of strategies for accelerating plant development and increasing yield. Such plant-growing strategies tend to focus on continuous production, and rarely, if ever, make allowances for the gardener's personal schedule or preferences for reduced production or harvests.

To accommodate a user's personal schedule or preferences for desired garden output, as well as improve the efficiency of energy and water utilization, a controller 324 uses a multi-mode control scheme to control the plant-growing system 100. Using the multi-mode control scheme, the controller 324 efficiently operates the plant-growing system 100 to grow plants or ripen fruit, or dynamically modify how or when plants grow or ripen fruit. Furthermore, using the multi-mode control scheme, the controller 324 can control the plant-growing system 100 to slow, pause, or otherwise modify the growth of a plant, including the flowering and ripening of fruit. In this way, the multi-mode control scheme provides for a more personalized plant-growing schedule, as well as a plant-growing system 100 that is more flexible and dynamic.

The multi-mode control scheme includes at least two discrete modes: a plant-growing mode and a plant-preservation mode. In plant-growing mode, the plant-growing system 100 operates to facilitate and maintain a steady or expedited growth of plants within the plant-growing system 100. For example, in plant-growing mode, the controller 324 can control a lighting system 130 to emit one or varying light intensities to the plants throughout a majority or more of the day. For instance, in some cases, the ratio of light periods to dark periods is high enough that the overall quantity of light (also referred to herein as a daily light integral or photoperiod) received by the plants is relatively high, as compared to plant-preservation mode. As an example, in plant-growing mode, the controller 324 can cause the lighting system 130 to emit light for eighteen consecutive hours (at one or varying light intensities), followed by a six-hour dark period. In this way, in plant-growing mode, the controller 324 causes the lighting system 130 to emit light according to a lighting schedule that focuses on increasing the photosynthesis functions of the plants and hence their growth and the quantity of biomass produced for consumption. Furthermore, in plant-growing mode, the controller 324 controls a watering system 110 to provide nutrient-enriched liquid to the plants at various time intervals. As an example, in plant-growing mode, the controller 324 can cause the watering system 110 to communicate liquid through the plant-growing system 100 for five consecutive minutes, three times a day. In this way, the plants receive liquids on a regular basis with a desired level of nutrients as well as a desired level of dissolved oxygen that the plants' roots need to thrive in the plant-growing mode.

In contrast, in plant-preservation mode, the controller 324 causes the plant-growing system 100 to operate to leverage differential kinetics of the plants' metabolism to reduce growth rates or harvest intervals while maintaining health and desired morphology. In plant-preservation mode, the daily light integral received by the plants is relatively low (e.g., half or lower), as compared to plant-growing mode. For example, in plant-preservation mode, the controller 324 controls a lighting system 130 to provide pulses or relatively short durations of intense light. In general, under intense light, the photosensitive regulation of certain hormones (for example, Auxin and Gibberellins) inside the plant prevents or limits stalk and branch elongation that typically happens in lower intensities of light. Furthermore, a plant's hormonal photo-response typically starts quickly when induced by high intensity light and that effect will typically last residually for a duration after the light is switched off. In plant-preservation mode, the controller 324 causes the lighting system 130 to emit light according to a lighting schedule that includes relatively short durations of intense light followed by longer durations of a dark period. In this way, in plant-preservation mode, the plants maintain the hormones that regulate elongation and stretching as if the plant is receiving sufficient quantities of light, but the introduction of periodic dark periods significantly reduces the photosynthetic activity, thereby slowing or pausing the plant's growth.

Furthermore, in plant-preservation mode, the controller 324 operates the plant-growing system 100 to regulate the stomatal apertures of the plants. In general, a stomatal aperture opens in response to light and closes in response to low light or darkness. However, a stomatal aperture rarely opens or closes immediately. The speed of the stomatal response (for example, how quickly a stomatal aperture reaches an open (or near open) state in response to light or reaches a closed (near closed) state in response to the absence of light) varies based on a number of factors, such as, but not limited to, the size of the stomatal aperture, the intensity of the light, the type of plant, temperature, carbon dioxide concentration, plant hydration levels, etc. The time a stomatal aperture takes to reach an open (or near open) state in response to light is generally referred to as the "stomatal opening response time," the time the stomatal aperture takes to reach a closed (or near closed) state in response to the absence of light is generally referred to as the "stomatal closing response time." The stomatal opening response time and the stomatal closing response time can each be several minutes long, such as 1, 2, 3, 5, 6, 10, 15, 20 or more minutes.

In plant-preservation mode, the controller 324 limits the consecutive time over which the lighting system 130 is active, as compared to plant-growing mode. In this way, the controller 324 limits or reduces the time over which the stomata are open, as compared to plant-growing mode. For example, in plant-preservation mode, the controller 324 can limit the consecutive time over which the lighting system 130 is active to a particular duration (for example, 1, 2, 3, 5, 8, 10, 20, or 30 minutes). In some cases, the consecutive active time of the lighting system 130 corresponds to the stomatal opening response time, such as a multiple (for example, 0.25, 0.5, 1, 1.5, 2, 3 times) or offset (for example, +/−2, 4, 5, 8, 10, or 15 minutes) of the stomatal opening response time. Accordingly, in plant-preservation mode, the plants of the plant-growing system 100 receive sufficient light to survive, yet the relatively short duration over which the stomata are open reduces the flow of carbon dioxide intake from leaves of the plants, the levels or amount of transpiration by the plants, the amount of photosynthetic activity by the plant, or the growth rate of the plants, as compared to the plant-growing mode.

In plant-preservation mode, the controller 324 controls the lighting system 130 to provide a dark period (low or no light) between activations of the lighting system 130. Sometimes, if the dark period is too short, then plants respond to light restoration with a near-instant recovery of the photosynthetic rate. To reduce photosynthetic recovery rates, in plant-preservation mode, the controller 324 controls the lighting system 130 to provide a dark period of a particular duration. In some cases, the length of the dark period is 10, 20, 30, or 45 minutes, 1, 1.5, 2, 2.5, or 4 hours, or more. In some cases, the length of the dark period corresponds to the stomatal closing response time, such as a multiple (for example, 0.25, 0.5, 1, 1.5, 2, 3 times) or offset (for example, +/−2, 4, 5, 8, 10, or 15 minutes) of the stomatal closing response time. In some cases, the length of the dark period corresponds to the length of the light period. For example, the dark period to light period ratio can be 1:1, 2:1, 3:1, 3:2, 4:1, 5:1, 5:2, etc. By providing a dark period of a particular duration between light activations, in plant-preservation mode, the plant-growing system 100 reduces the amount of photosynthetic activity by the plant or the growth rate of the plants, as compared to plant-growing mode.

Furthermore, the presence or absence of liquid influences the regulation of the stomata. Accordingly, in plant-preservation mode, the controller 324 activates the watering system 110 such that a duty cycle of the watering system 110 (for example, a pump of the watering system 110) does not satisfy or exceed a threshold watering duty cycle (for example, 0.1%, 0.2%, 0.05%, 1%, 1.5%) or a period of the watering duty cycle of the watering system 110 satisfies or exceeds a threshold period (for example, 4, 8, 12, or 24 hours). By reducing the amount of liquid provided to the plants, in plant-preservation mode, the stomata are open for a shorter amount of time and the plants grows at a slower rate than in plant-growing mode.

As part of the multi-mode control scheme, the controller 324 selects its controller 324 mode (for example, plant-growing mode or plant-preservation mode), identifies parameters associated with the selected mode, or determines a control schedule associated with the selected mode. For example, the controller 324 can select, activate, or transition to the plant-growing mode during or in response to an expected availability of the user. In contrast, the controller 324 can select, activate, or transition to a plant-preservation mode during or in response to an expected unavailability or unwillingness to tend to the plant-growing system 100. Furthermore, in some cases, as part of activating the plant-preservation mode, the controller 324 determines a control schedule based on the expected unavailability or the available resources of the plant-growing system 100. In this way, the particular control schedule for plant-preservation mode is dynamic. For example, a particular control schedule may be based on the duration of the unavailability, plant information (for example, the number, size, or type of plant), or an amount of availability resources (for example, water or energy). In this way, in plant-preservation mode, the plant-growing system 100 efficiently and dynamically utilizes its resources, while also accounting for the particular schedule or preference of the user.

In some cases, the plant-growing mode or the plant-preservation mode are defined by preset or distinct parameter ranges or thresholds. For example, the plant-growing mode and the plant-preservation mode can be associated with mutually exclusive parameter ranges or thresholds. In this way, the values associated with one or more parameters (for example, duty cycle, period, average intensity, daily light integral) may provide an indication of the particular controller mode. For example, in some cases, the plant-growing mode is defined by a lighting period duty cycle of 50% or more, a lighting period of one hour or more, an average light intensity (while the lighting system is active) of 85% or less, a watering period duty cycle of 1% or more, a lighting period of ten hours or less, or a daily light integral of 5 $mol \cdot m^{-2} \cdot d^{-1}$ or more. As another example, in some cases, the plant-preservation mode is defined by a lighting period duty cycle of 40% or less, a lighting period of forty-five minutes or less, an average light intensity (while the lighting system is active) of 95% or more, a watering period duty cycle of 0.9% or less, a lighting period of eleven hours or more, or a daily light integral of 3 $mol \cdot m^{-2} \cdot d^{-1}$ or less. Accordingly, in some such cases, various values of duty cycle, period, average intensity, or daily light integral may indicate the mode in which the controller is operating. For example, using the value above, in some cases, a lighting period duty cycle of 33% indicates that the controller is operating in plant-preservation mode, a lighting period of 3 hours indicates that the controller is operating in plant-growing mode, an average light intensity (while the lighting system is active) of 90% does not, but itself, indicate a controller mode, a watering period duty cycle of 0.4% indicates that the controller is operating in plant-preservation mode or less, and a daily light integral of 25 $mol \cdot m^{-2} \cdot d^{-1}$ indicates that the controller is operating in plant-growing mode. It will be understood that plant-preservation mode and/or plant-growing mode may be defined by any one or any combination of the above-mentioned or other parameters. Furthermore, in some cases, one or more parameter values or thresholds for the plant-growing mode and the plant-preservation mode may at least partially overlap, such as that the plant-growing mode and the plant-preservation mode are not associated with mutually exclusive parameter ranges or thresholds. Furthermore, it will be understood that the above mentioned thresholds or ranges are merely illustrative and should not be construed as limiting.

System Overview

FIG. 1 illustrates a perspective view of an example plant-growing system 100, in accordance with some examples. The plant-growing system 100 includes a watering system 110, a planting system 120, and a lighting system 130, and an imaging system 140. The plant-growing system 100 represents an example plant-growing system and other examples may use fewer, additional, or different components or arrangements. For example, any combination of components of the plant-growing system 100 may be combined.

The planting system 120 holds one or more plants. For example, the planting system 120 can removably receive plant-growing containers 124, which can removably receive seed receptacles 126. The planting system 120 includes one or more modules 122 that are combinable in an end-to-end configuration to form at least a portion of a planting column 132. In the illustrated example of FIG. 1, the planting system 120 includes three planting columns 132, with each planting column 132 having ten modules 122. However, depending on the implementation, the planting system 120 can include any number of modules 122 or planting columns 132. Each module 122 of the planting system 120 includes port 142 configured to removably receive a plant-growing container 124. The port 142 extends radially outward from a wall of the module 122 and includes an orifice sized to receive a plant-growing container 124. A plant-growing container 124 removably inserts into a port 142 of a module 122. The plant-growing container 124 includes a reservoir configured to hold liquid and a port for removably receiving a seed receptacle 126. A seed receptacle 126 engages with, or inserts into, a port of a plant-growing container 124. The seed receptacle 126 includes a cavity for receiving or storing a plant medium, such as a seed at least partially encompassed by a substrate. As described in more detail with respect to FIG. 2, the planting system 120 receives liquid from the watering system 100 and supplies the liquid to modules 122, the plant-growing containers 124, and the seed receptacles 126 by way of gravitational flow through openings within the modules 122.

In some instances, a seed receptacle 126 includes a machine-readable code or label, such as a barcode (for example, but not limited to, a one-dimensional barcode or a two-dimensional barcodes, such as a QR code), a radio-frequency identification (RFID) tag, a near-field communication tag, etc. In some cases, each seed receptacle 126 includes a machine-readable code, label, or tag that includes an identifier that corresponds to a particular plant with which the particular seed receptacle 126 includes. The identifier can be associated with plant information in a database (for example, data store 326) to allow subsequent identification of plant information using the identifier. In some cases, the identifier is an alphanumeric identifier that identifies a plant from other plants or a species of plant from other specifies of plants. For example, in some cases, the identifier is a unique identifies that uniquely identifiers a particular seed receptacle 126 from all other seed receptacles 126. As another example, in some cases, the identifier is a species identifier that uniquely identifies a particular plant species from all other plant species. In some such cases, the seed receptacles 126 that include the same plant species include or are associated with the same identifier.

The watering system 110 communicates liquid to the planting system 120. The liquid may include an aqueous solution that includes plant nutrients, plant foods, etc. For example, the liquid may include commercially available plant nutrients that are suitable for plants grown in a soilless plant-growing system 100. In addition or alternatively, the liquid includes mineral or bio-derived nutrient solutions in a water solvent. The watering system 110 includes a pump (not shown) that communicates the liquid to the planting system 120. In some cases, a watering system 110 includes controllable parameters, such as a pump speed, flow rate of the liquid, etc.

A controller (not shown) can control the watering system 110 according to a watering schedule. A watering schedule indicates when, how, or for how long to activate (turn on) the watering system 110. For example, the watering schedule can indicate a quantity of distinct watering periods within a block of time, where each watering period is associated with a particular duration of time and/or a particular duty cycle over which to activate the watering system 110 during the particular duration of time. The quantity of distinct watering periods within the block of time may vary, for example based on the controller mode. For instance, in some cases, the quantity of distinct watering periods within the block of time is larger in plant-growing mode (for example, 3 distinct watering periods over 24 hours) and smaller in plant-preservation mode (for example, 2 distinct watering periods over 24 hours).

The duty cycle of a watering period is a percentage or fraction that indicates when or for how long the watering system 110 is active over the watering period. For example, a 2% duty cycle over a ten-hour watering period indicates that the watering system 110 is active for twelve minutes of the ten-hour watering period. In some cases, the duty cycle corresponds to a consecutive time in which the watering system 110 is active. For example, a watering period that lasts ten hours and has a 1% duty cycle indicates that the watering system 110 is active for six consecutive minutes of the ten-hour watering period. However, it will be understood that the on-time associated with a duty cycle may not be consecutive. With respect to the previous example, the six minutes of the ten-hour watering period can be divided at different times throughout the watering period.

The particular duty cycle of a watering period can vary, for example based on the controller mode. For instance, in some cases, a duty cycle of a watering period is higher in plant-growing mode (for example, 1, 2, 3, 4, or 5%) and lower in plant-preservation mode (for example, 0.5, 1, 2, or 3%). For example, in plant-growing mode, the duty cycle may be 5/480 (for example, indicating that the watering system 110 is active for five minutes out of 8 hours), while in plant-preservation mode, the duty cycle may be 5/720 (for example, indicating that the watering system 110 is active for five minutes out of 12 hours).

In some cases, the watering system 110 cycles from active to inactive, or inactive to active, during a particular watering period. In some such cases, each watering period can correspond to a duration of time over which the watering system 110 is activated and deactivated one time. For example, a particular watering period can extend from a start time of an activation to an end time of a deactivation (for example, just before another activation), or from a start time of a deactivation to an end time of activation (for example, just before another deactivation). As an example, the watering period can include a 2% duty cycle, indicating that the watering system 110 is active for 2% of the time of the watering period and inactive for 98% of the time of the watering period. In some cases, the watering system 110 remains active for the entirety of a watering period. As an example, the watering period can include a 100% duty cycle, indicating that the watering system 110 is active for the entire watering period. In some cases, the watering system 110 remains inactive for the entirety of a watering period. As an example, a watering period can include a 0% duty cycle, indicating that the watering system 110 is inactive for the entire watering period.

The particular duration of a particular watering period may vary, for example based on the controller mode. For instance, in some cases, a watering period is shorter in plant-growing mode (for example, 4, 6, or 8 hours) and longer in plant-preservation mode (for example, 8, 12, or 18 hours). The plurality of distinct watering periods may vary amongst each other such that any two or more may have the same or different duty cycle or duration. Alternatively, in some cases, each of the plurality of distinct watering periods are identical, having the same duty cycle and duration.

The lighting system 130 includes one or more light sources. The one or more light sources can include a light-emitting diode (LED) or other source that emits light. In some cases, a light source emits light of one or more wavelengths. For example, a light source can include multiple emitters configured to emit light at different wavelengths a controllable light source having an adjustable wavelength of the light emitted from the light source. In some cases, the lighting system 130 includes controllable parameters, such as the intensity of light emitted by the lighting system 130, the wavelength(s) of light emitted by the lighting system 130, or the duration of light emitted by the lighting system 130.

A controller (not shown) can control the lighting system 130 according to a lighting schedule. A lighting schedule indicates when, how, or for how long to activate (turn on) the lighting system 130. For example, the lighting schedule can indicate a quantity of distinct lighting periods within a block of time, where each lighting period is associated with a particular duration of time, a particular duty cycle over which to activate the lighting system 130 during the particular duration of time, and/or one or more intensities of light. The quantity of distinct lighting periods within the block of time may vary, for example based on the controller mode. For instance, in some cases, the quantity of distinct lighting periods within the block of time is smaller in plant-growing mode (for example, 5 distinct lighting periods over 24 hours) and larger in plant-preservation mode (for example, 25 distinct lighting periods over 24 hours).

The duty cycle of a lighting period is a percentage or fraction that indicates when or for how long the lighting system 130 is active over the lighting period. For example, a 50% duty cycle over a ten-minute lighting period indicates that the lighting system 130 is active for five minutes of the ten-minute lighting period. In some cases, the duty cycle corresponds to a consecutive time in which the lighting system 130 is active. For example, a lighting period that lasts six hours and has a 33% duty cycle indicates that the lighting system 130 is active for two consecutive minutes of the six-hour lighting period.

The particular duty cycle of a lighting period can vary, for example based on the controller mode. For instance, in some cases, a duty cycle of a lighting period is higher in plant-growing mode (for example, 60, 70, 80, 90, or 100%) and lower in plant-preservation mode (for example, 15, 25, 33, or 40%). For example, in plant-growing mode, the duty cycle may be 75% (for example, indicating that the lighting system 130 is active for 8 hours out of 12 hours), while in plant-preservation mode, the duty cycle may be 33% (for example, indicating that the lighting system 130 is active for ten minutes out of thirty minutes).

In some cases, the lighting system 130 cycles from active to inactive, or inactive to active, during a particular lighting period. In some such cases, each lighting period can correspond to a duration of time over which the lighting system 130 is activated and deactivated one time. For example, a particular lighting period can extend from a start time of an activation to an end time of a deactivation (for example, just before another activation), or from a start time of a deactivation to an end time of activation (for example, just before another deactivation). As an example, the lighting period can include a 50% duty cycle, indicating that the lighting system 130 is active for 50% of the time of the lighting period and inactive for 50% of the time of the lighting period. In some cases, the lighting system 130 remains active for the entirety of a lighting period. As an example, the lighting period can include a 100% duty cycle, indicating that the lighting system 130 is active for the entire lighting period. In some cases, the lighting system 130 remains inactive for the entirety of a lighting period. As an example, a lighting period can include a 0% duty cycle, indicating that the lighting system 130 is inactive for the entire lighting period.

In some cases, an intensity of light changes throughout a single lighting period. For example, the duration (or period) of a particular lighting period can correspond to the length of time the light source emits light at a first intensity level. In addition or alternatively, the duration (or period) of a particular lighting period can correspond to the length of time the light source emits light at any of a plurality of intensity levels. For example, a lighting period may include a five-hour period in which the light source is activated at a first intensity level, stays at the first intensity level (for example, 70% intensity) for four hours, and then the intensity is modified to a second intensity level (for example, 95% intensity) for a period of one hour. As another example, a lighting period may include a one-hour period including the following sequence: light source at a first intensity level for ten minutes, stays at the first intensity level (for example, 70% intensity) for four hours, and then the intensity is modified to a second intensity level (for example, 95% intensity) for a period of one hour.

The particular duration of a particular lighting period may vary, for example based on the controller mode. For instance, in some cases, a lighting period is longer in plant-growing mode (for example, 8, 12, or 16 hours) and shorter in plant-preservation mode (for example, 20, 30, 60, or 90 minutes). The plurality of distinct lighting periods may vary amongst each other such that any two or more may have the same or different duty cycle, light intensity, or duration. Alternatively, in some cases, each of the plurality of distinct lighting periods may have the same duty cycle, light intensity, or duration.

The imaging system 140 can include a camera or other image capture device that can be configured to capture images or video of one or more plants of the plant-growing system 100 over time. In some cases, the imaging system 140 can provide real-time or near real-time images or video of one or more plants. In some cases, the imaging system 140 scans a code associated with a seed receptacle 126 to determine whether the seed receptacle 126 is compatible with the plant-growing system 100 or to obtain an identifier that can be used to consult a database to identify plant information.

A controller (not shown) can control the imaging system 140 according to an imaging schedule. An imaging schedule indicates when, how, or for how long to activate (turn on) the imaging system 130. For example, the imaging schedule can indicate a quantity of distinct imaging periods within a block of time, where each imaging period is associated with a particular duration of time, a particular number of images, or a particular duty cycle over which to activate the imaging system 130. For example, an imaging period may last eight hours, where the image capture device is active for 10 seconds and inactive for seven hours and fifty minutes.

Additional details, examples, or features relating to the plant-growing system 100 are described in the '729 publication, which was previously incorporated by reference herein.

Figure 2:
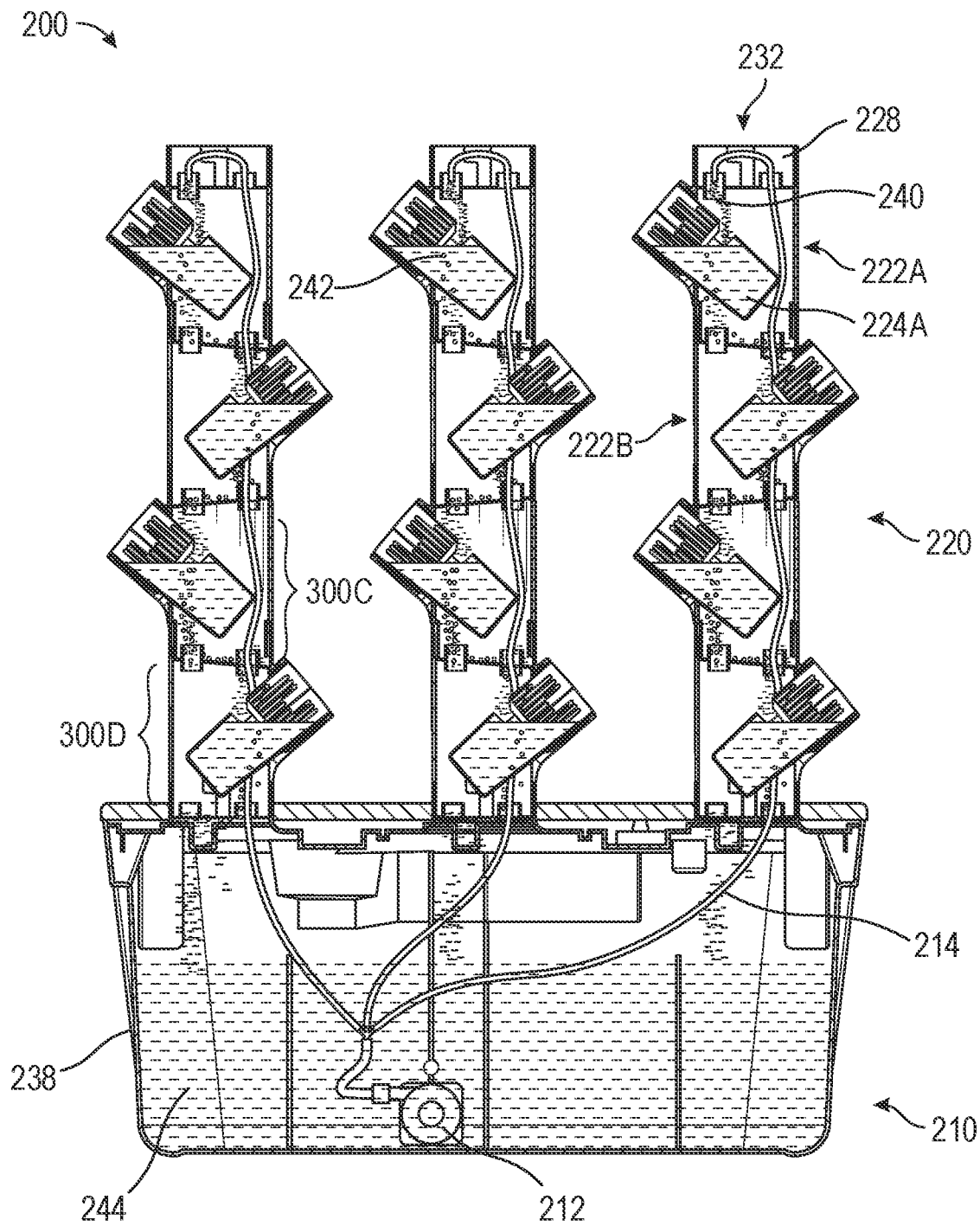
FIG. 2 illustrates a cross-sectional side view of an example plant-growing system, in accordance with some examples.

FIG. 2 illustrates a cross-sectional side view of an example plant-growing system 200, in accordance with some examples. The plant-growing system 200 includes a watering system 210 and a planting system 220. It will be appreciated that the plant-growing system 200 represents an example plant-growing system and other examples may use fewer, additional, or different components or arrangements. For example, the plant-growing system 200, the watering system 210, or the planting system 220 may be examples of the plant-growing system 100, the watering system 110, or the planting system 120, respectively, of FIG. 1 or may include one or more of the components of the plant-growing system 100, such as the lighting system 130 or the imaging system 140.

The watering system 210 includes a pump 212 fluidically coupled to portions of the plant-growing system 200 and configured to distribute liquid 244 thereto. In some cases, the pump 212 couples to one or more portions of conduit 214 that extend from the pump 212 to the planting system 220. In some cases, the conduit 214 connects to an uppermost module 222A or a cap 228 of a planting column 232. In this way, the pump 212 can distribute liquid 244 from the tank 238 to (or near) the top of the planting system 220. The liquid 244 can trickle down through the planting column 232, and some of the liquid may be captured in the various plant-growing containers 224, absorbed by plants, flow back into the tank 238, or the like.

As a non-limiting example, during operation of the pump 212, the pump 212 can transport, via the conduit 214, at least some of the liquid 244 in the tank 238 to an uppermost module 222A of the planting column 232. The liquid 244 is received by the uppermost module 222A and flows through an aperture 240 of the uppermost module 222A into a plant-growing container 224A residing in the uppermost module 222A. As the pump 212 continues to operate, a portion of the plant-growing container 224A fills with the liquid 244 and some of the liquid 244 overflows from the plant-growing container 224A, flows out of the uppermost module 222A, and trickles down (for example, due to gravity) into the next uppermost module 222B. The liquid 244 follows this liquid flow path through the planting column 232 and into the tank 238. Upon deactivation of the pump 212, the liquid 244 within the plant-growing containers 224 continues to flow out of the aperture 242 until each of the plant-growing containers 224 has a liquid level equal to a threshold corresponding to the aperture 242.

Figure 3:
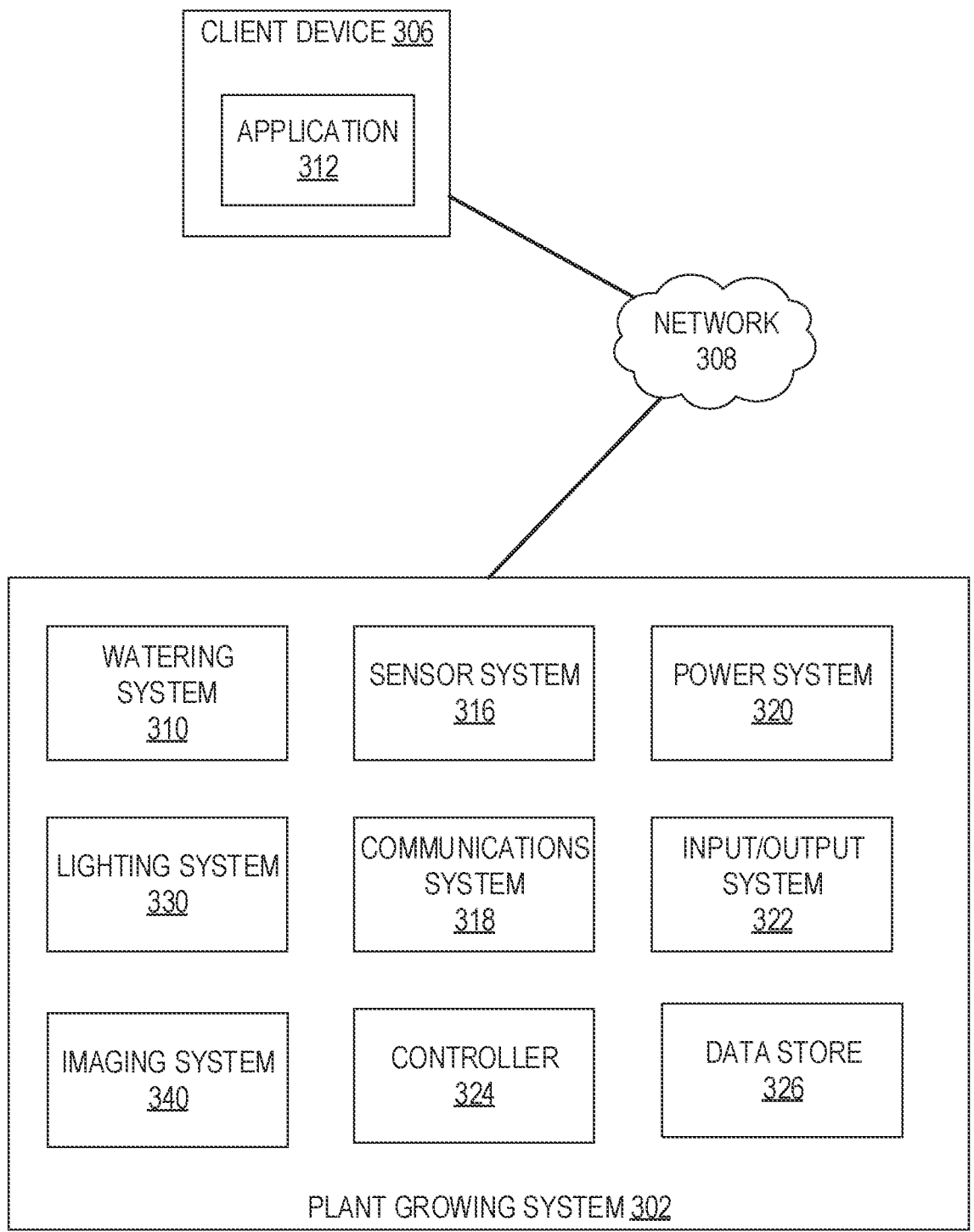
FIG. 3 illustrates a block diagram of an example plant-growing environment, in accordance with some examples.

FIG. 3 illustrates a block diagram of an example plant-growing environment 300 that includes a plant-growing system 302, a client device 306, and a network 308. To simplify discussion and not to limit the present disclosure, FIG. 3 illustrates only one plant-growing system 302 and one client device 306, though multiple may be used. Furthermore, it will be understood that the environment 300 can include fewer, different, or additional devices or systems, as desired.

Any of the foregoing components or systems of the environment 300 may communicate with each other, such as via the network 308. Although only one network 308 is illustrated, multiple distinct or distributed networks 310 may exist. The network 308 can include any type of communication network. For example, the network 308 can include one or more of a wide area network (WAN), a local area network (LAN), a cellular network (for example, LTE, HSPA, 3G, or other cellular technologies), an ad hoc network, a satellite network, a wired network, a wireless network, Bluetooth, and so forth. The network 308 can include the Internet. In some cases, a wired connection connects two or more of the components or systems of the environment 300. In some cases, any one or any combination of the components or systems of the environment 300 may include an Ethernet adapter, cable modem, Wi-Fi adapter, cellular transceiver, baseband processor, Bluetooth or Bluetooth Low Energy (BLE) transceiver, or the like, or a combination thereof.

Any of the foregoing components or systems of the environment 300, such as any one or any combination of the plant-growing system 302 or the client device 306 may be implemented using individual computing devices, processors, distributed processing systems, servers, isolated execution environments (for example, virtual machines, containers, etc.), shared computing resources, or so on. Furthermore, any of the components or systems of the environment 300 may be combined with or may include software, firmware, hardware, or any combination(s) of software, firmware, or hardware suitable for the purposes described.

The client device 306 facilitates interactions with, management of, or control of the plant-growing system 302. The client device 306 provides an interface through which a user can interact to monitor one or more plants in the plant-growing system 302, adjust settings of the plant-growing system 302, determine or implement control schedules, transition between controller modes (for example, plant-growing mode, plant-preservation mode, etc.), obtain plant- or system-related resources (for example, troubleshooting tips, how-tos, etc.), contact or interact with support, complete plant transactions (for example, order plants, offer plants for sale), or the like.

In some cases, the client device 306 implements an application 312. For example, the client device 302 may represent any computing device capable of interacting with or running the application 312. The application 312 facilitates the interactions with, management of, or control of the plant-growing system 302. In some cases, the application 312 includes a web browser, a mobile application or "app," a background process that performs various operations with or without direct interaction from a user, or a "plug-in" or "extension" to another application, such as a web browser plug-in or extension. Although FIG. 3 illustrates the client device 302 implementing the application 312, any of the components or systems of the environment 300 may host, execute, or interact with the application 312. For example, in some cases, the plant-growing system 302 implements the application 312.

Examples of client devices 306 include, without limitation, smart phones, tablet computers, handheld computers, wearable devices, laptop computers, desktop computers, servers, portable media players, gaming devices, remote controls, and so forth. In some cases, the client device 306 is integrated with the plant-growing system 302.

The plant-growing system 302 includes a watering system 310, a lighting system 330, an imaging system 340, a sensor system 316, a communications system 318, a power system 320, an input/output system 322, a data store 326, or a controller 324. The plant-growing system 302 can be an example of or include one or more components or features of the plant-growing system 100 of FIG. 1 or the plant-growing system 200 of FIG. 2. The plant-growing system 302 can include fewer, different, or additional components, as desired.

The watering system 310, lighting system 330, or imaging system 340 can be examples of or include one or more components or features of the watering systems 110 or 210, the lighting system 130, or the imaging system 140, respectively. The watering system 310 includes one or more liquid movement devices, such as a pump, to communicate liquid throughout the plant-growing system 302. The lighting system 330 includes one or more light sources, such as one or more LEDs, to emit light to the plants of the plant-growing system 302. The imaging system 340 includes one or more imaging systems, such as a camera.

The sensor system 316 captures sensor data relating to the plant-growing system 302. In some cases, the sensor data is processed in real-time and communicated to the controller 324 or the client device 306. For example, the sensor system 316 can include any one or any combination of a temperature sensor, an optical sensor, a humidity sensor, a liquid flow sensor, a liquid level sensor, a pH sensor, an electrical conductivity sensor, an imaging sensor, or the like. The sensor data can include, but is not limited to, temperature data, pH data, humidity data, liquid level data, optical data, electrical conductivity data, or image data.

A temperature sensor captures data relating to temperature. In some cases, based on the temperature data from the temperature sensor, the controller 324 can determine an ambient air temperature or the liquid temperature of liquid in the watering system 310. An optical sensor captures data relating to light. In some cases, based on the sensor data from the optical sensor, the controller 324 can determine an intensity or quantity of light emitted by the lighting system 330 or received by the plants of the plant-growing system 302, or an intensity or quantity of ambient light. A humidity sensor captures data relating to water vapor or hygrometry. In some cases, based on the humidity data from the humidity sensor, the controller 324 can determine various humidity-related parameters, such as relative humidity, absolute humidity, dew point, etc.

A liquid flow sensor captures data relating to liquid flow through the plant-growing system 302. In some cases, based on the sensor data from the liquid flow sensor, the controller 324 determines a liquid flow rate, or determines the existence of a blockage condition in the plant-growing system 302. For example, a determination that the liquid flow rate that does not satisfy a liquid flow threshold may indicate that one or more conduits of the watering system 310 is at least partially blocked. In some cases, the liquid flow sensor detects liquid flow through an aperture of a module. In this way, the controller 324 can monitor the liquid flow through the module and can provide an indication of liquid flow, such as a liquid blocked alarm.

A liquid level sensor captures data relating to the amount of liquid in the plant-growing system 302, such as the amount of liquid in the tank 138. In some cases, the liquid level sensor includes an ultrasonic sensor configured to obtain data relating to the distance of a target object by emitting ultrasonic sound wave. For example, in some cases, an ultrasonic sensor measures a distance to the surface of the water. In this way, the distance increases as the liquid level decreases. In some such cases, a maximum distance can correspond to an empty tank 138, while a minimum distance can correspond to a full tank 138. In some cases, the liquid level sensor includes one or more of a level meter that includes a float ball, which floats on the liquid in the tank and provides a measure of a level of liquid in the tank 138. In some cases, the liquid level sensor includes a pressure sensor or sonar device. In some cases, based on the sensor data from the liquid level sensor, the controller 324 can determine the amount of liquid in the tank. Furthermore, as described herein, based on the amount of liquid in the tank, the controller 324 can determine a liquid consumption rate over a desired period.

A pH sensor captures data relating to acidity or alkalinity, such as the acidity or alkalinity of the liquid in the plant-growing system 302. In some cases, based on the pH data from the pH sensor, the controller 324 determines a pH, acidity, or alkalinity of the liquid in the plat growing system 302. An electrical conductivity sensor captures data relating to electrical conductivity of the liquid in the plant-growing system 302. In some cases, based on the sensor data from the electrical conductivity sensor, the controller 324 determines an electrical connectivity measurement, or data relating to nutrient levels in the liquid.

An imaging sensor, such as a camera, captures an image or video of at least a portion of a plant residing in plant-growing system 302. For example, in some cases, the imaging sensor capture a series of images or a time lapse of images over a period. In some cases, based on the image data from the imaging sensor, the controller 324 can determine or estimate a growth rate of a plant, a development stage of the plant, a size of the plant, an expected time until a harvesting period, a size of a plant (for example, based on a number of leaves, size of a leaf or plant, or a total weight of the plant), etc. In some cases, the imaging sensor is part of the imaging system 340.

Sensor data from the sensor system 316 can be processed in real-time or near real-time by the sensor system 316 itself (for example, using a processor), using a processing device of the plant-growing system 302, such as the controller 324, or using a processing device associated with the client device 306. In some cases, the sensor data is processed to determine various parameters relating to the planting growing system 100. The parameters can include, but are not limited to, liquid levels in the planting growing system 100, liquid or air temperatures, ambient or lighting system light intensity, liquid consumption by one or more of the plants, a plant growth rate, a plant health status, light intensity, air quality, or a projected optimal harvesting date or range.

The communications system 318 facilitates wired or wireless communication with one or more other systems or devices, such as the client device 306 or the application 312. For example, the communications system 318 can include a transceiver that includes an antenna. The communications system 318 can be configured for any of a variety of applications, such as satellite technology (e.g. GPS), Bluetooth, BLE, Wi-Fi, near-field communication (NFC), mobile networks (e.g. 3G and 4G), or any combination thereof.

The power system 320 supplies power to, or receives power for, the plant-growing system 302. For example, in some cases, the power includes a power supply (for example, one or more batteries, a wall outlet connector, etc.) and electronics to drive the watering system 310, the lighting system 330, the imaging system 340, the sensor system 316, the communications system 318, the input/output system 322, the data store 326, or the controller 324. In some cases, the power system 320 provides or receives AC power. In some cases, the power system 320 provides or receives DC power. In some cases, the power system 320 includes one or more batteries can be configured to provide a status (for example, capacity, charge level, degradation, etc.) to the controller 324.

The input/output system 322 allows for user input into the plant-growing system 302 and/or provides indications or alarms to the user. For example, input/output system 322 can include one or more buttons, switches, speakers, microphones, displays, or any combination thereof. In some cases, the input/output system 322 includes a speaker for alarms, such as voice directed alarms. As another example, the input/output system 322 includes a screen for input or visual display, one or more status light indicators, etc. In some cases, the input/output system 322 is part of the client device 306.

The data store 326 manages data within the plant-growing environment 300. In some cases, the data store 326 manages or stores plant information. Plant information can include, but is not limited to, data relating to various plant species, such as species name, expected-time-to-sprout data, expected-time-to-mature data, expected harvesting period data, expected aesthetically pleasing period data, liquid consumption data, harvest indicator data, etc. In some cases, the plant information is based on historical data or patterns.

The species name can include a name or other identifier of a plant species, such as but not limited to, American Mustard, Arugula, Bok Choi, Breen, Bulls Blood, Buttercrunch, Butterhead, Cardinale, Celery, Endive Lettuce, Flashy Trout Back, Green Mustard, Kale, Kale Lacinato, Lollo Rossa, Matilda, Monte Carlo, Red Mustard, Red Romaine, Red Sails, Red Salad Bowl, Romaine, Rouge D'hiver, Swiss Chard, Tatsoi, Watercress, Wheatgrass, Basil, Catnip, Chives, Cilantro, Dill, Italian Parsley, Lemongrass, Mexican Tarragon, Mint, Oregano, Purple Basil, Rosemary, Sage, Shiso, Sorrel, Stevia, Thai Basil, Thyme, Cherry Tomatoes, Cucumbers, Mini-Eggplant, Jalapeños, Sweet Peppers, Strawberries, Sugar Snap Peas, Blue Cornflower, Borage, Campanula, Chamomile, Fiesta Gitana, Lavender, Night Scented Stock, Oopsy Daisy, Petunia, Radio Calendula, Red Marietta Marigold, or Torenia.

The expected-time-to-sprout data can include an indication of an estimated length of time that a particular plant will take to grow from a seed into a sprout (sometimes referred to as germinate) after the seed is introduced to water. In some cases, a user places the seed receptacles 126 into the plant-growing system 302 after the sprout emerges. The estimated length of time that a particular plant will take to grow from a seed into a sprout may vary based on the species of the plant, as well as a number of factors including, but not limited to, the amount of water or light provided to the seed. The estimated length of time that a particular plant will take to grow from a seed into a sprout can include a few days, a week, a couple of weeks, etc. For example, an expected time to sprout for Basil may be between 5 and 21 days, an expected time to sprout for Peas may be between 7 and 14 days, and an expected time to sprout for Wheatgrass may be less than 7 days.

The expected-time-to-mature data can include an indication of an estimated length of time that a particular plant will take to grow from a sprout into a mature plant after the seed receptacles 126 storing the sprout is added to the plant-growing system 302. The estimated length of time that a particular plant will take to mature may vary based on the species of the plant, as well as a number of factors including, but not limited to, the amount of water or light provided to the plant or the controller mode (for example, plant-preservation mode or plant-growing mode). The estimated length of time that a particular plant will take to mature can include a few days, a week, a couple of weeks, a month, a few months, etc. For example, an expected time to mature for Chamomile may be 75-120 days, an expected time to mature for Jalapenos may be 60 days (for green ripe) or 80 days (for red ripe), an expected time to mature for Mint may be 60 to 75 days.

The expected harvesting period data can include an indication of an estimated length of time (sometimes referred to as a harvesting period) that a particular plant will be available for harvest after the plant matures. In some cases, the estimated harvesting period corresponds to a period over which the plant tastes as is intended or desired, or safe to taste. In some cases, the estimated harvesting period extends from a time of maturity to a time immediately prior to initial plant degradation (for example, it begins to die). In some cases, the estimated harvesting period corresponds to a period over which the plant is edible. In some cases, the estimated harvesting period corresponds to a period over which the plant is expected to bear fruit. In some cases, the estimated harvesting period corresponds to a period over which fruit of the plant is expected to be ripe. The estimated harvesting period may vary based on the species of the plant, as well as a number of factors including, but not limited to, the amount of water or light provided to the plant or the controller mode (for example, plant-preservation mode or plant-growing mode). The estimated harvesting period can include a few days, a week, a couple of weeks, a month, a few months, etc. For example, an estimated harvesting period for Oregano may be 8 to 12 weeks, an estimated harvesting period for Rosemary may be 1 week to 1 year, and an estimated harvesting period for Thyme may be 4 to 12 weeks.

The expected aesthetically pleasing period data can include an indication of an estimated length of time (sometimes referred to as an aesthetic period) that a particular plant will be mature or will be aesthetically pleasing. In some cases, the estimated aesthetic period corresponds to a period over which the plant is at full bloom. In some cases, the estimated aesthetic period extends from a time of maturity to a time immediately prior to initial plant degradation (for example, when the plant begins to die). In some cases, the estimated aesthetic period corresponds to a period over which the plant is expected to be most colorful. In some cases, the estimated aesthetic period corresponds to a period over which the plant is expected to have flowers. In some cases, the estimated aesthetic period corresponds to a period over which the plant is expected to have its largest flowers or greatest bloom. In some cases, estimated aesthetic period corresponds to a period over which the plant is expected to bear fruit. The estimated aesthetic period may vary based on the species of the plant, as well as a number of factors including, but not limited to, the amount of water or light provided to the plant or the controller mode (for example, plant-preservation mode or plant-growing mode). The estimated aesthetic period can include a few days, a week, a couple of weeks, a month, a few months, etc. For example, an estimated aesthetic period for Chamomile may be 6 to 10 weeks and an estimated aesthetic period for Blue Cornflower may be 3 to 5 weeks.

Figure 6:
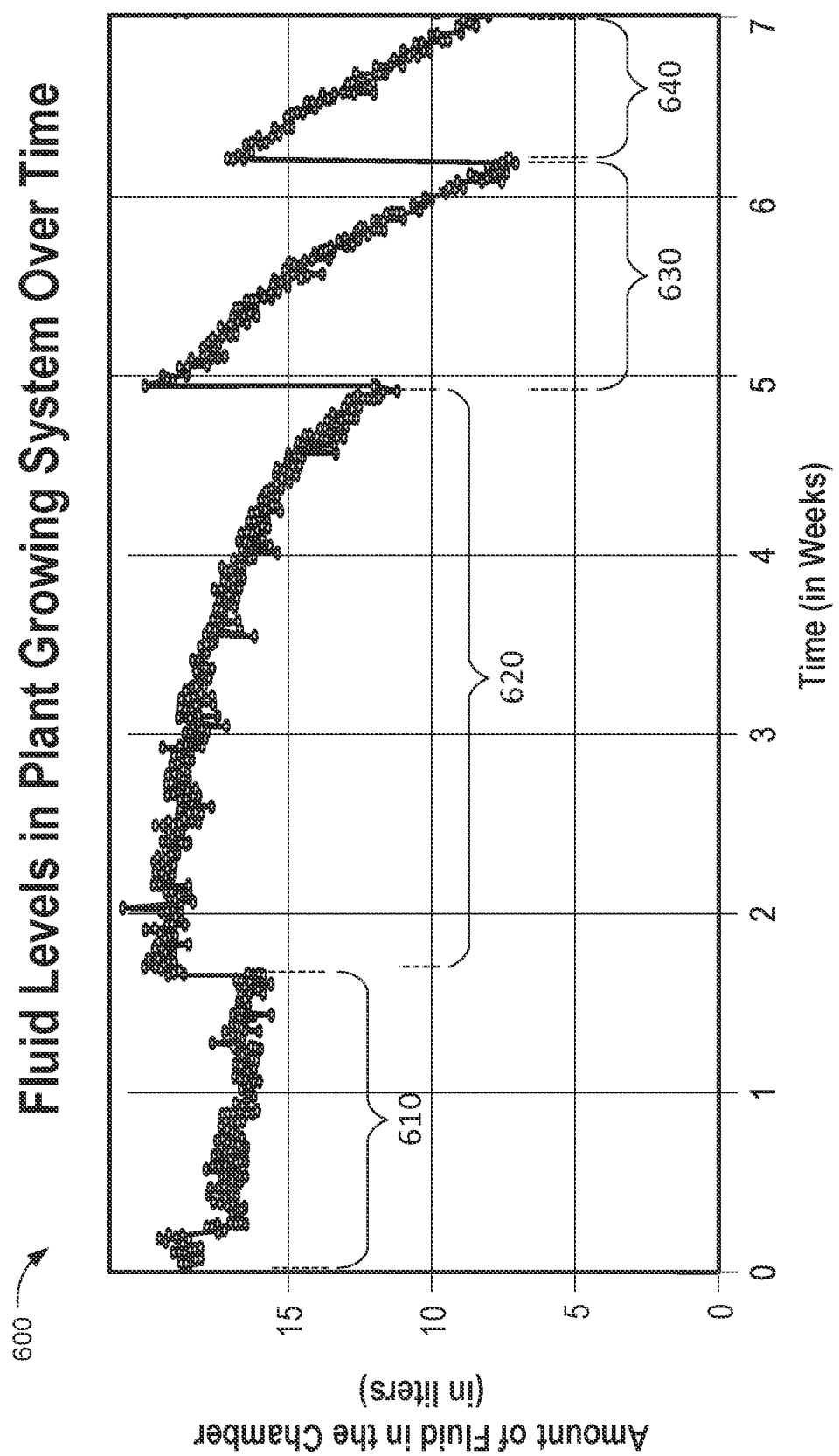
FIG. 6 is a graph illustrating example liquid levels in a plant-growing system over time.

The liquid consumption data can include information relating to liquid consumed or taken in by one or more plants. In some cases, the liquid consumption data can indicate how much liquid a particular species of plant is expected to consume over time, or at varying stages of development. For example, the liquid consumption rate for a particular plant correlates with the plant's development stage in that the liquid consumption rate increases over time as the plant grows. For example, assuming the same species and lighting conditions, a sprout may consume less water than a 3-week old plant, and the 3-week old plant may consume less water than a fully mature plant. FIG. 6 is a graph illustrating example liquid levels in a plant-growing system over time. In some cases, the data store 326 can include liquid consumption data for each species of plant. In some cases, the data store 326 can include liquid consumption data for each species of plant at varying lighting schedules. In some cases, the data store 326 can include liquid consumption data for the average plant or a particular number of average plants. For example, consider a scenario in which the plant-growing system 302 holds a maximum of 30 plants. In such a scenario, the liquid consumption data may include expected liquid consumption rates for various combinations of species of plants, lighting schedules, number of plants, etc. In some cases, liquid consumption data may be usable to determine a predicted species of one or more plants, a number of plants in a planting column 132 or plant-growing system 302, a develop stage of one or more plants, a health of one or more plants, etc. For example, the liquid consumption data for the plant-growing system 302 may be compared to liquid consumption data in the data store 326.

The harvest indicator data can include information indicating when to harvest a particular plant species. For example, the harvest indicator data may indicate a size of a plant, leaf, or stem, a condition of the plant, or the like that indicates the plant is ready for harvest. The harvest indicator data can vary based on plant species. For example, harvest indicator data for Romaine may indicate to harvest once the leaves reach about 4 inches tall and harvest indicator data for Peas may indicate to harvest the pods as they swell but before they are fully plump.

In some cases, the data store 326 can associate identifiers with the stored plant information. For example, as described herein, each seed receptacle 126 may be associated with an identifier. In some cases, the data store 326 can associate a particular identifier with a corresponding plant information such that, using the identifier, the controller 324 can store or look up plant information in the data store 326.

The location or implementation of the data store 326 can vary. For example, in some cases, the data store 326 is included or implemented in the plant-growing system 302. In some cases, the data store 326 includes or is implemented as cloud storage, such as Amazon Simple Storage Service, Elastic Block Storage, Google Cloud Storage, Microsoft Azure Storage, etc. In some cases, the data store 326 includes one or more data stores storing data received from one or more of a client device 306, a client application 312, or a plant-growing system 302. The data store 326 can be configured to provide high availability, highly resilient, or low loss data storage.

The controller 324 is communicatively coupled to the watering system 310, the lighting system 330, the imaging system 340, the sensor system 316, the communications system 318, the power system 320, the input/output system 322, or the data store 326. The controller 324 can include one or more processors. In some cases, the controller 324 is in communication with one or more cloud-based servers.

The controller 324 can control or operate one or more components of the plant-growing system 302 according to a control schedule. For example, as described herein, the controller 324 can utilize a multi-mode control scheme that can include at least two discrete modes: a plant-growing mode and a plant-preservation mode, and each of the modes can be associated with a control schedule, which can indicate when to activate (turn on) or deactivate (turn off) particular components, as well as particular operating parameters to be implemented during operation of those components. In some cases, the control schedule includes one or more schedules for particular components of the plant-growing system 302. For example, the control schedule can include a lighting schedule, a watering schedule, a sensor schedule indicating when, how, or for how long to operate the sensor system 316, a power system schedule indicating when, how, or for how long to operate the power system 320, an imaging schedule, etc.

In some cases, the controller 324 can select, generate, or modify a control schedule to can reduce the duration of one or more lighting periods, reduce the duty cycle of one or more lighting periods, increasing the quantity of lighting periods over a particular block of time, and/or increase average intensity of light when the lighting system is active. In this way, the controller can facilitate extending the life of a plant, extending or delaying a particular stage of the plant (for example, an aesthetically pleasing stage, a harvesting stage, a low liquid consumption stage, etc.), reducing an amount of energy or liquid consumed by the plant over a particular time period, etc.

The controller 324 can determine to activate a particular mode (for example, plant-growing mode or plant-preservation mode), or determine to transition from one more to another mode, using any of a variety of techniques. For example, in some cases, the controller 324 receives a request to activate a particular mode from the client device 306 and activates the particular mode, or transitions from another mode to the particular mode, based on a request.

Furthermore, the controller 324 can be configured to determine that a user associated with the plant-growing system 302 is, or will be, unavailable or a threshold distance away (for example, 150 miles) from the plant-growing system 302, and can activate a particular mode, or transition from one mode to another mode, based at least in part the determination.

In some cases, to transition from the plant-growing mode to the plant-preservation mode, the controller 324 transitions a duty cycle of the lighting system 330 from a first duty cycle associated with the plant-growing mode to a second duty cycle associated with the plant-preservation mode, where the first duty cycle is larger than the second duty cycle. For example, the first duty cycle may be between 60% and 100% and the second duty cycle may be between 10% and 50%. In some cases, to transition from the plant-growing mode to the plant-preservation mode, the controller 324 is configured to transition a period of the duty cycle of the lighting system 330 from a first period associated with the plant-growing mode to a second period associated with the plant-preservation mode, where the first period is larger than the second. For example, the first period may be between 8 hours and 48 hours, and the second period be between 5 minutes and 3 hours. In some cases, to transition from the plant-growing mode to the plant-preservation mode, the controller 324 transitions an average intensity of light, when the lighting system 310 is active, from a first intensity associated with the plant-growing mode to a second intensity associated with the plant-preservation mode, where the first intensity is lower than the second intensity. For example, the first intensity may be between 45% and 90%, and the second intensity may be between 75% and 100%. In some cases, to transition from the plant-growing mode to the plant-preservation mode, the controller 324 transitions a duty cycle of the watering system 310 from a first duty cycle associated with the plant-growing mode to a second duty cycle associated with the plant-preservation mode, where the first duty cycle is larger than the second duty cycle. For example, the first duty cycle may be between 1% and 5% and the second duty cycle may be less than 1% or between 1% and 3%.

Furthermore, in some cases, to transition from the plant-preservation mode to the plant-preservation mode, the controller 324 transitions at least one of a lighting duty cycle of the lighting system 330 from a first lighting duty cycle associated with the plant-preservation mode to a second lighting duty cycle associated with the plant-growing mode, a period of the duty cycle of the lighting system 330 from a first period associated with the plant-preservation mode to a second period associated with the plant-growing mode, an average intensity of light (when the lighting system 310 is active) from a first intensity associated with the plant-preservation mode to a second intensity associated with the plant-growing mode, or a watering duty cycle of the watering system 310 from a first watering duty cycle associated with the plant-preservation mode to a second watering duty cycle associated with the plant-growing mode. In some such cases, the second lighting duty cycle may be between 60% and 100% and the first lighting duty cycle may be between 10% and 50%, the second period may be between 8 hours and 48 hours, and the first period be between 5 minutes and 3 hours, the second intensity may be between 45% and 90%, and the first intensity may be between 75% and 100%, or the second watering duty cycle may be between 1% and 5% and the first watering duty cycle may be less than 1% or between 1% and 3%.

In some cases, the transition in duty cycle, period, or intensity of the lighting system 330 or watering system 310 from a first amount associated with a first mode (for example, plant-growing mode) to a second amount associated with a second mode (for example, plant-preservation mode) can be occur according to at least one of a stepwise pattern, a simple exponential curve, an S-shaped exponential curve, or a J-shaped exponential curve. As another example, in some cases, the transition in duty cycle, period, or intensity of the lighting system 330 or the watering system 310 from a first amount associated with a first mode to a second amount associated with a second mode may occur right away.

In some cases, the controller 324 can receive sensor data from the sensor system 316 or image data from the imaging system 340. Based on the sensor data or the image data, the controller 324 can determine at least one of a level of liquid in the tank 138, a pH of the liquid the plant-growing system 302, an electrical conductivity of the liquid the plant-growing system 302, a temperature (for example, of the liquid or ambient air) associated with the plant-growing system 302, a hygrometry/humidity associated with the plant-growing system 302, a growth rate or expected growth rate of a plant of the plant-growing system 302, plant health data, an expected harvest date for a plant of the plant-growing system 302, a type of plant in the plant-growing system 302, the unique identifier of the seed receptacle, a number of modules, plant-growing containers, or seed receptacles being utilized in the plant-growing system 302, an amount of light provided to the plant-growing system 302, an amount of light provided to a module, plant-growing container, or seed receptacle of the plant-growing system 302, etc.

In some cases, the controller 324 can determine data associated with a plant of the plant-growing system 302 based on one or more images received from the imaging system 340. For example, the controller 324 determine or estimate a growth rate of the plant based on one or more of the images and or can predict or estimate a harvest date based on the growth rate. For example, in some cases, the controller 324 can perform image recognition algorithms to break down the image into each plant present in the plant-growing system 302. In some cases, using the image data, the controller 324 determines the particular location (for example, particular planting column 132 or particular module 300) at which the plant is located. Image recognition algorithms can be based on pre-trained Convolutional Neuronal Networks, which can compute a size of a plant (for example, based on a number of leaves, size of a leaf or plant, or a total weight of the plant). In some cases, the system can determine a growth rate of the plant. For example, in some cases, one or more images or portions thereof are compared with historical and standard data for the plant under these conditions, which can allow computation of when the plant will come to maturity or will be ready for harvesting.

In some cases, based on the sensor data or image data, the controller 324 can control or adjust the plant-growing system 302 (for example, the watering system 310, the lighting system 330, etc.) to optimize the growth of the plants or modify a growth rate (and thus, an estimated harvest date) of the plants. In some cases, based on the sensor data, the image data, or an internal clock, the controller 324 can output one or more notifications to a user. In some cases, the notification can include a notification to perform an action to be undertaken (for example, add water, harvest plants, order new plants, etc.).

In some cases, the controller 324 can determine whether a seed receptacle (for example, seed receptacle 126 of FIG. 1) is compatible with the plant-growing system 302. For example, as described herein, each seed receptacle 126 can be associated with an identifier. In some cases, prior to inserting a seed receptacle 126 into the plant-growing system 302, a user can scan the seed receptacle 126 (for example, scan a bar code, RFID tag, QC code, etc.) to determine the compatibility of the seed receptacle 126 with the plant-growing system 302. In some cases, if the seed receptacle 126 is not associated with an expected identifier, then the controller 324 determines that the seed receptacle 126 is incompatible with the plant-growing system 302. In some cases, the controller can prevent or restrict (for example, limited) operation of the plant-growing system 302 until a valid seed receptacle 126 (for example, a seed receptacle 126 associated with an expected identifier) is scanned.

Graphical User Interface (GUI)

FIGS. 4A, 4B, 5A, and 5B illustrate example mobile user interfaces 400, 450, 500, 550 indicating various control schedules for a plant-growing system, in accordance with some examples. Mobile user interfaces such as any of interfaces 400, 450, 500, 550 may be presented on a display, such as on a display of the client device 306 of the plant-growing system 302 of FIG. 3. For example, in some cases, the application 312 generates one or more of the mobile user interfaces 400, 450, 500, 550. As illustrated, the mobile user interfaces 400, 450, 500, 550 include various display objects that can indicate one or more parameters of a control schedule, such as parameters of a lighting schedule or watering schedule.

Figure 4A:
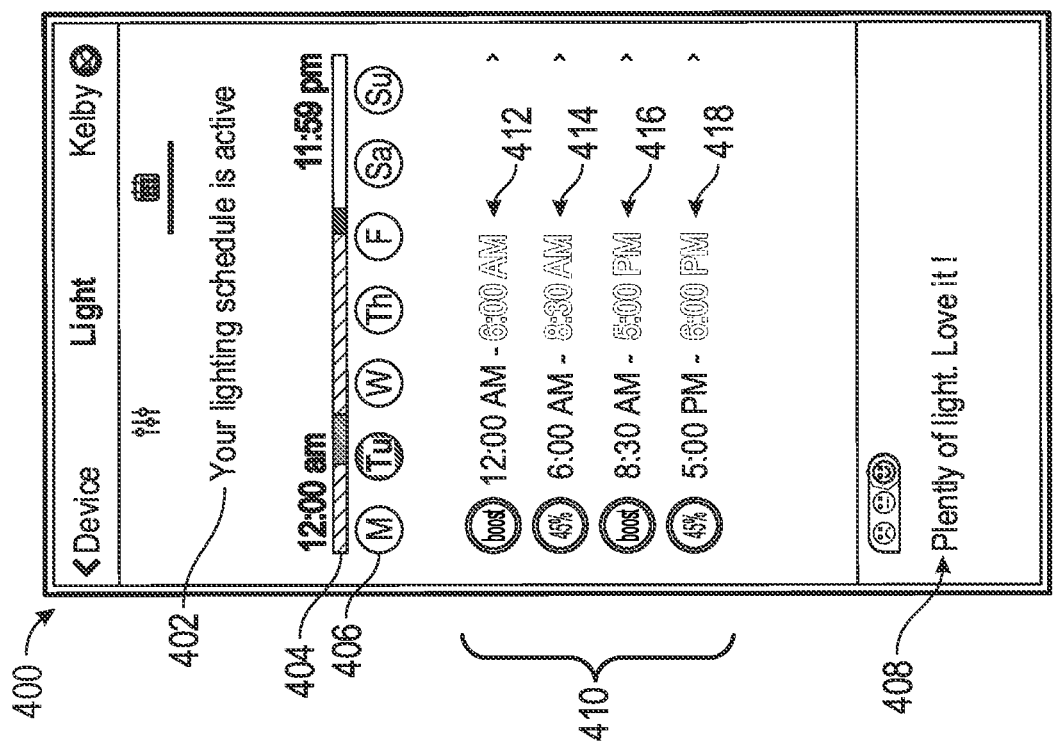
FIGS. 4A, 4B, 5A, and 5B illustrate example mobile user interfaces indicating various control schedules for a plant-growing system, in accordance with some examples.

The mobile user interface 400 of FIG. 4A includes a list 410 of a plurality of lighting periods 412, 414, 416, 418 associated with an active lighting schedule. In particular, the lighting periods include a first lighting period 412 that lasts from 12:00 AM to 6:00 AM (6 hours) with 100% intensity (noted by "boost") and 100% duty cycle; a second lighting period 414 that lasts from 6:00 AM to 8:30 AM (2.5 hours) with 45% intensity and 100% duty cycle; a third lighting period 416 from 8:30 AM to 5:00 PM (8.5 hours) with 100% intensity and 100% duty cycle; and a fourth lighting period 418 from 5:00 PM to 6:00 PM (1 hour) with 45% intensity and 100% duty cycle, and a fifth lighting period (indicated by the bar chart 404) from 6:00 PM to 11:59 AM (6 hours) with 0% duty cycle. In some cases, the five lighting periods are collectively referred to as a single lighting period that has a varying intensity. For example, the collective lighting period may last 24 hours and be defined by the following parameters: intensity: variable (sequence of 100% for 6 hours, 45% for 2.5 hours, 100% for 8.5 hours, 45% for 1 hour); duty cycle: 66% (active for 18 consecutive hours and inactive for 6 consecutive hours); and a period of 24 hours.

The mobile user interface 400 includes a visual indication of the lighting schedule in the form of a bar graph 404 and a day-of-the-week identifier 406 indicating that this is Tuesday's lighting schedule. The mobile user interface 400 also includes an indication 402 ("Your lighting schedule is active") that the lighting schedule is active, as well as an indication 408 as to whether the active lighting schedule is determined to be sufficient.

Figure 4B:
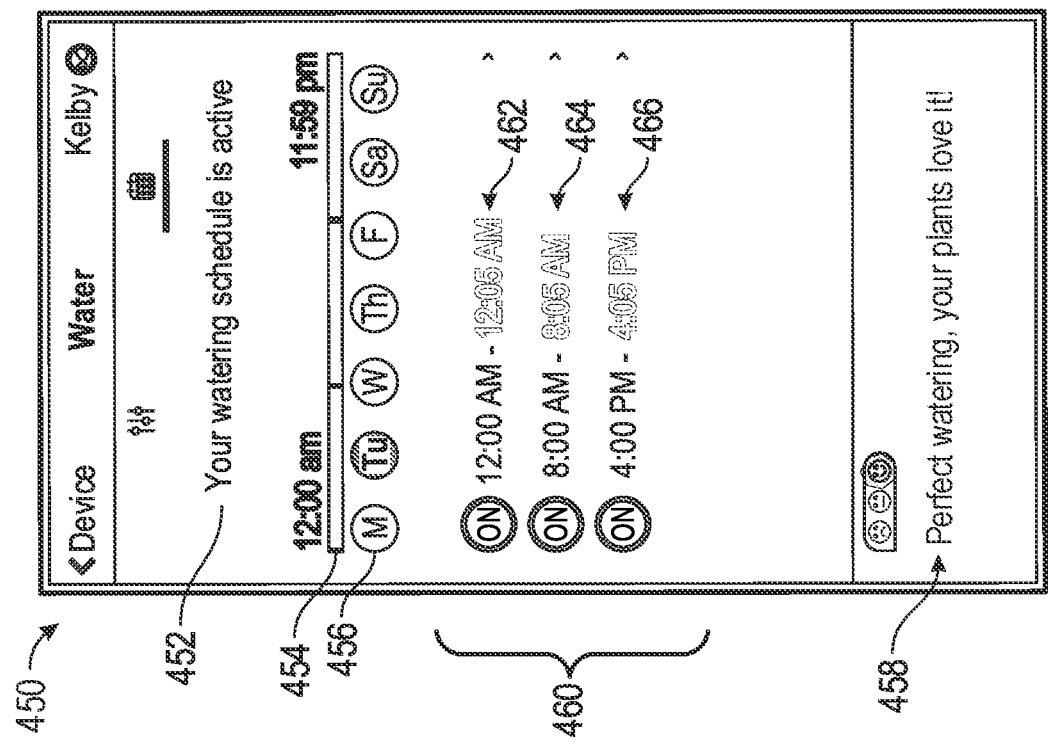

The mobile user interface 450 of FIG. 4B includes a list 460 of a plurality of watering periods associated with a watering schedule, namely a first watering period 462 from 12:00 AM to 8:00 AM, ~1% duty cycle (5 minutes over eight hours); a second watering period 464 from 8:00 AM to 4:00 PM, ~1% duty cycle (5 min over eight hours); and a third watering period 466 from 4:00 PM to 12:00 AM, ~1% duty cycle (5 min over eight hours). Furthermore, the mobile user interface 450 includes a visual indication of the watering schedule in the form of a bar graph 454 and a day-of-the-week identifier 456 indicating that this is Tuesday's watering schedule. The mobile user interface 450 also includes an indication 452 ("Your watering schedule is active") that the watering schedule is active, as well as an indication 458 as to whether the active watering schedule is determined to be sufficient. In some cases, the lighting schedule shown in FIG. 4A and the watering schedule shown in FIG. 4B can correspond to a plant-growing mode.

Figure 5B:
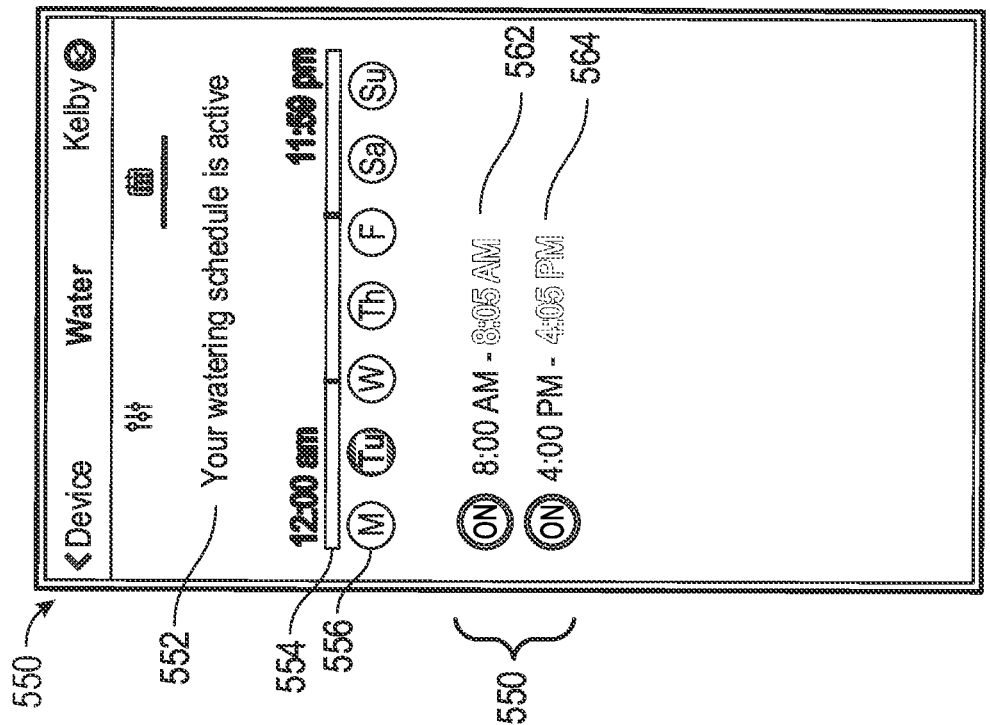
Figure 5A:
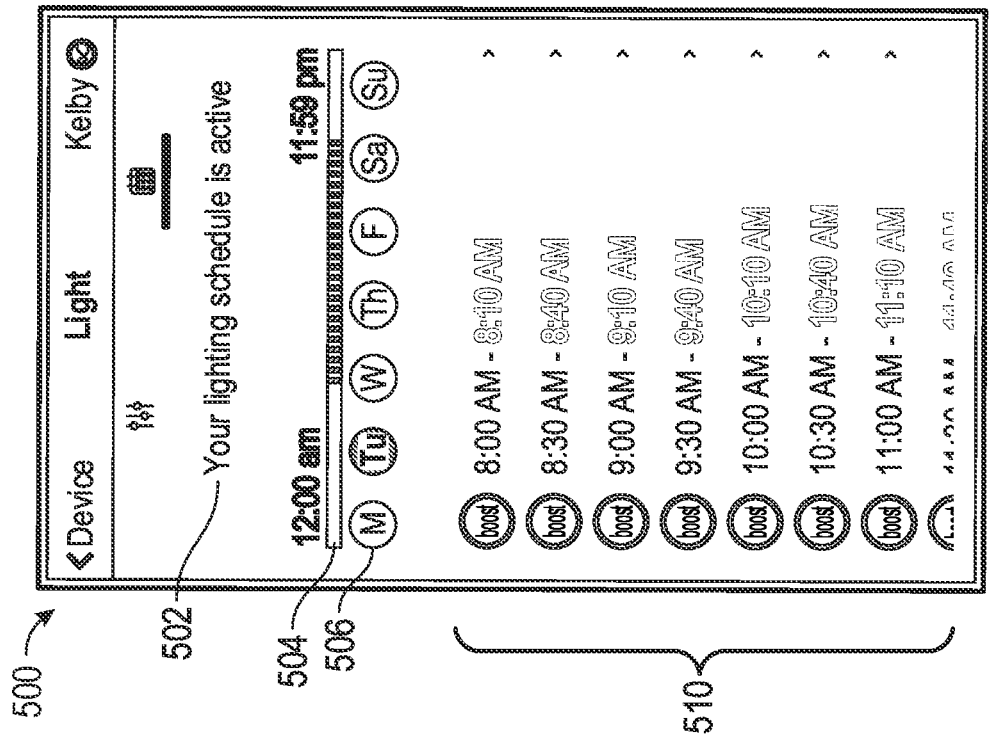

The mobile user interface 500 of FIG. 5A includes a list 510 of a plurality of lighting periods associated with a lighting schedule. In particular, the list 510 (in combination with the bar chart 504) indicates that there are 24 consecutive lighting periods, where each lighting period has the following parameters: 100% intensity, 33% duty cycle, a period of 30 minutes. Furthermore, as indicated by the bar chart 504, there are lighting periods from 12:00 AM to 8:00 AM and 8:00 PM to 11:59 PM with 0% duty cycle. Furthermore, the mobile user interface 550 of FIG. 5B includes a list of a plurality of watering periods associated with a watering schedule, namely a first watering period 562 from 12:00 AM to 11:59 AM (with a 5/720 duty cycle (5 minutes over twelve hours)) and a second watering period 564 from 12:00 PM to 11:59 PM (with a 5/720 duty cycle (5 minutes over twelve hours)). Furthermore, the mobile user interface 550 includes a visual indication of the watering schedule in the form of a bar graph 554 and a day-of-the-week identifier 556 indicating that this is Tuesday's watering schedule. The mobile user interface 550 also includes an indication 552 ("Your watering schedule is active") that the watering schedule is active, as well as an indication 558 as to whether the active watering schedule is determined to be sufficient. In some cases, the lighting schedule shown in FIG. 5A and the watering schedule shown in FIG. 5B can correspond to a plant-preservation mode.

Referring back to FIG. 1, the plant-growing system 100 can monitor or determine the amount of liquid in the tank 138 using any of a variety of techniques. For example, in some cases, the plant-growing system 100 includes an ultrasonic sensor positioned near the top of the tank 138 and configured to measure a distance to the surface of the liquid (also referred to as the liquid level). In some such cases, a relatively short distance corresponds to a larger amount of liquid in the tank 138, since an increase in liquid causes the liquid levels in the tank 138 to increase and the surface of the liquid to move closer to the ultrasonic sensor. As a corollary, a relatively large distance corresponds to a smaller amount of liquid in the tank 138, since a decrease in liquid causes the liquid levels in the tank 138 to decrease and the surface of the liquid to move further from the ultrasonic sensor.

FIG. 6 is a graph 600 illustrating changes in the quantity of liquid the tank 138 of the plant-growing system 100 over time. The horizontal axis on the graph 600 corresponds to time, in weeks. The horizontal axis also corresponds to the development of the plants in the plant-growing system 100, where time=0 corresponds to an early time in plant development (for example, when the plants are relatively small) and where time=7 corresponds to a later time in the plant development (for example, when the plants are relatively large). The vertical axis on the graph 600 corresponds to the quantity of liquid the tank 138, in liters. FIG. 6 is merely an example of liquid consumption over time and should not be construed as limiting.

A plurality of downward sloping periods 610, 620, 630, and 640 characterizes the graph 600. Each of these periods 610, 620, 630, and 640 corresponds to a replenishment of the tank 138 and subsequent consumption of liquid by the plants. For example, the first period 610 indicates a liquid consumption of approximately three liters over an eleven day span (approximately 0.27 liters/day); the second period 620 indicates a liquid consumption of approximately seven liters over a twenty-three day span (approximately 0.30 liters/day); the third period 630 indicates a liquid consumption of approximately eleven liters over a ten day span (approximately 1.1 liters/day); and the fourth period 640 indicates a liquid consumption of approximately seven liters over a five day span (approximately 1.8 liters/day).

As indicated by the various slopes of the periods 610, 620, 630, and 640, as well as the average consumption per day, the rate at which the plants consume liquid (sometimes referred to a liquid consumption rate) may increase over time as the plants grow. Accordingly, the liquid consumption rate (or other proportionally related parameters) can be a useful measure in the determination of a variety of plant related parameters, such as plant size, growth rate, plant health, etc. For example, a relative increase in liquid consumption over time may indicate that the plant size is increasing or that the plant is healthy. In contrast, a relative decrease in liquid consumption over time may indicate that the plant is dying. Further still, a moderate change in liquid levels over time may indicate that the plants are at an early stage of development, while a more drastic change in liquid levels over time may indicate that the plants are at a later stage of development.

In some cases, the liquid consumption rate is compared to stored plant information to identify additional plant information associated with the plants. For example, as described herein, the data store 326 can store a database that includes plant information. The database can associate the liquid consumption data with different plant information such that the controller 324 can determine various plant information based on the liquid consumption data. As a corollary, the controller 324 can determine expected liquid consumption data based on plant information. As a non-limiting example, the data store may indicate that liquid consumption in the range of 0 to 0.5 liters per day corresponds to a plant in an early stage of development, liquid consumption in the range of 0.5 to 1 liter per day corresponds to a plant in a middle stage of development, and liquid consumption greater than 1 liter per day corresponds to a plant in a later stage of development. In some cases, a database may include relationships based on number of plants, type of plant, development stage, etc.

Similar determinations can be made using parameters or measurements that are correlated to liquid consumption. For example, as described herein, an ultrasonic sensor can measure a distance to the surface of the liquid. In some such cases, the measured distance and liquid consumption are inversely correlated.

It will be understood that the liquid consumption rate can vary based on a number of factors including, but not limited to, the number of plants in the plant-growing system, the species or type of plants in the plant-growing system, the development stage, maturity level, or size of the plants in the plant-growing system, the lighting schedule applied, etc.

Determining Plant Information

Figure 7:
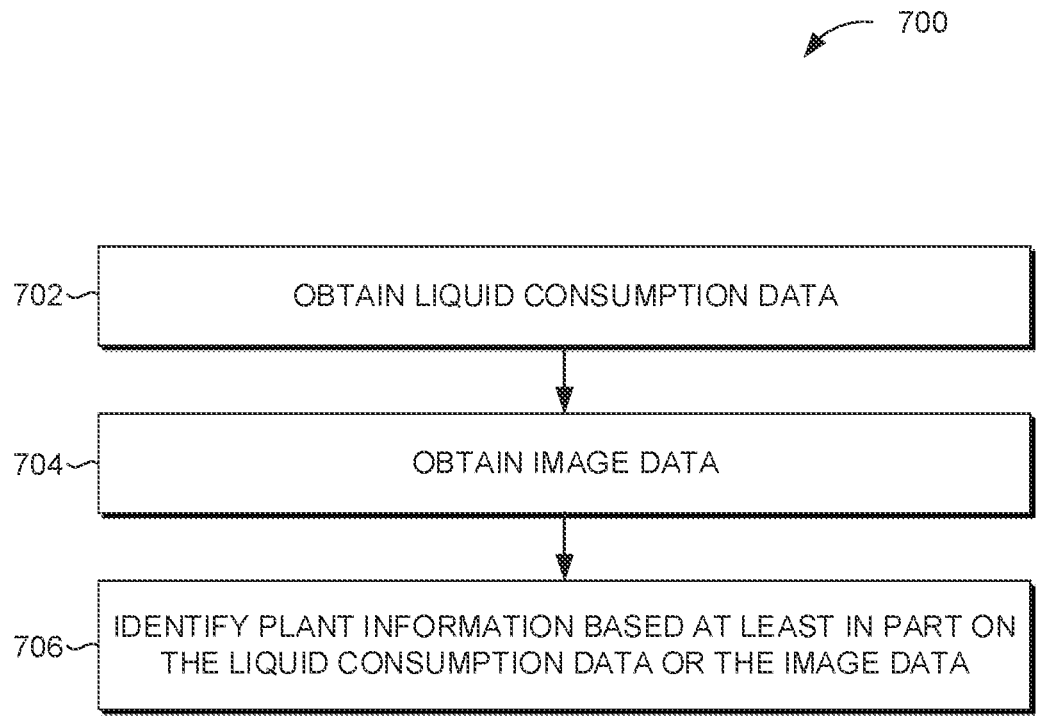
FIG. 7 is a flow diagram illustrative of an example of a routine for estimating or determining plant information for one or more plants in a plant-growing system.

FIG. 7 is a flow diagram illustrative of an example of a routine for estimating or determining plant information for one or more plants in a plant-growing system, such as the plant-growing system 100, 200, or 302 of FIG. 1, 2, or 3, respectively. One skilled in the relevant art will appreciate that the elements outlined for routine 700 can be implemented by one or more computing devices, such as the controller 324 of FIG. 3. Routine 700 has been logically associated as being generally performed by the controller 324. However, the following illustrative embodiment should not be construed as limiting. Furthermore, it will be understood that the various blocks described herein with reference to FIG. 7 can be implemented in a variety of orders. For example, the controller 324 can implement some blocks concurrently or change the order as desired. Furthermore, fewer, more, or different blocks can be used as part of the routine 700.

At block 702, the controller 324 obtains liquid consumption data from the sensor system 316. The liquid consumption data can include any information usable to determine a liquid consumption rate of one or more plants in the plant-growing system 302. In some cases, the liquid consumption data includes information relating to an amount of liquid in the plant-growing system 302 over a particular period.

The sensor system 316 includes one or more sensors configured to obtain the liquid consumption data. For example, the sensor system 316 can include an ultrasonic sensor, a level meter, a pressure sensor, a sonar device, or other sensor or device configured to obtain information relating to an amount of liquid in the plant-growing system 302.

The controller 324 obtains liquid consumption data associated with a first period. The first period can vary. For example, in some cases, the first period includes a recent period, such as the past twelve, 24, or 48 hours, the past week, or the past month. In some cases, the first period includes a time since a refill of the tank 138. In some cases, the first period corresponds to the controller mode. For example, the first period can correspond to a duration of plant-growing mode or plant-preservation mode. In some cases, the first period includes a time since one or more plants were added to the plant-growing system. In some cases, the first period includes a time since a particular development stage of one or more plants (for example, sprout stage, maturity, etc.). In some cases, the first period includes a full or partial timeline of the plant-growing system 302.

At block 704, the controller 324 obtains image data. The controller 324 can obtain image data from the imaging system 340. The image data can include one or more images, such as a series of images, over a second period. The second period can vary, similar to as described above with respect to the first period associated with the liquid consumption data. In some cases, the first period is substantially equal to the second period. In some cases, the first period and the second period are different.

At block 706, the controller 324 identifies plant information based on the liquid consumption data and/or the image data. The plant information can vary across embodiments. For example, as described herein, the plant information can include, but is not limited to, a species name, expected-time-to-sprout data, expected-time-to-mature data, expected harvesting period data, expected aesthetically pleasing period data, liquid consumption data, harvest indicator data, etc. In some cases, the plant information can correspond to a single plant. In some cases, the plant information can correspond to multiple plants, such as a set of plants in the plant-growing system.

In some cases, using the image data, the controller 324 detects or determines a set of characteristics of one or more plants. For example, using the image data, the controller 324 can determine the determine or estimate one or more of a number of plants in the plant-growing system 302, a species of one or more plants in the plant-growing system 302, or a color of one or more plants in the plant-growing system 302, a size (for example, an overall size of a plant, an individual leaf size, a stem length, a fruit size, etc.), a number of leaves, etc. In some cases, the image data can include a plant identifier corresponding to a machine-readable code on the seed receptacle. In some cases, using the liquid consumption data, the controller 324 can estimate or determine a liquid consumption rate by one or more plants over a particular period.

In some cases, the controller 324 identifies the plant information from the data store 326. For example, by comparing the image data and/or the liquid consumption data to the stored plant information, the controller 324 can advantageously identify or predict additional plant information. For example, the controller 324 may use any combination of the image data, the liquid consumption data, or the various information determined from the liquid consumption data or the image data to identify one or more parameters to use to lookup plant information in the data store 326.

Using these parameters, the controller 324 can find matching or similar parameters stored in the data store 326 and can identify plant information associated with those matching or similar parameters.

As a non-limiting example, consider a scenario in which the controller 324 processed the image data and the liquid consumption data and estimates that the plant-growing system 302 includes 20 plants and has a liquid consumption rate of seven liters over the last twenty-one days. In some such cases, the controller 324 can consult the data store 326 to find plant information associated with approximately 20 plants and a consumption rate of seven liters over twenty-one days, or one liter every three days. In consulting the data store 326, the controller 324 may find a matching or similar set of parameters, along with other associated plant information. For example, the data store 324 may indicate that 20 plants having a consumption rate of one liter every three days corresponds to recently mature plants within their harvesting or aesthetically pleasing period.

As described herein, the identified plant information can vary. For example, the plant information can include, but is not limited to, an estimated number of plants, an estimated size of one or more plants, an estimated plant species, an estimated plant growth rate, an estimated plant health status, an estimated time until a harvesting or aesthetic period, an estimated age of one or more of the plants, etc.

The various blocks described herein with respect to FIG. 7 can be implemented in a variety of orders. Furthermore, the controller 324 can implement one or more of the blocks concurrently and/or change the order, as desired, and fewer, more, or different blocks can be used as part of the routine 700. For example, in some cases, controller 324 may obtain different or additional data, such as any plant information. For example, the controller 324 may identify a recent or past lighting schedule, watering schedule, or mode (for example, plant-preservation mode or plant-growing mode). Furthermore, the controller 324 may obtain other sensor data from the sensor system 316 including, but not limited to, temperature data, optical data, humidity data, liquid flow data, pH data, liquid level data, or electrical conductivity data.

Plant-Preservation Mode

Implementation of a plant-preservation mode can advantageously allow the plant-growing system 302 to adjust environmental conditions associated with the plant-growing system 302 to slow, pause, or otherwise alter growth of the plants in the plant-growing system 302. In addition or alternatively, in some cases, implementation of a plant-preservation mode facilitates efficient utilization of energy or liquid. For example, implementation of a plant-preservation mode can reduce an amount of power consumed by the plant-growing system 302 or reduce the amount of liquid consumed by the plants of the plant-growing system 302.

Figure 8:
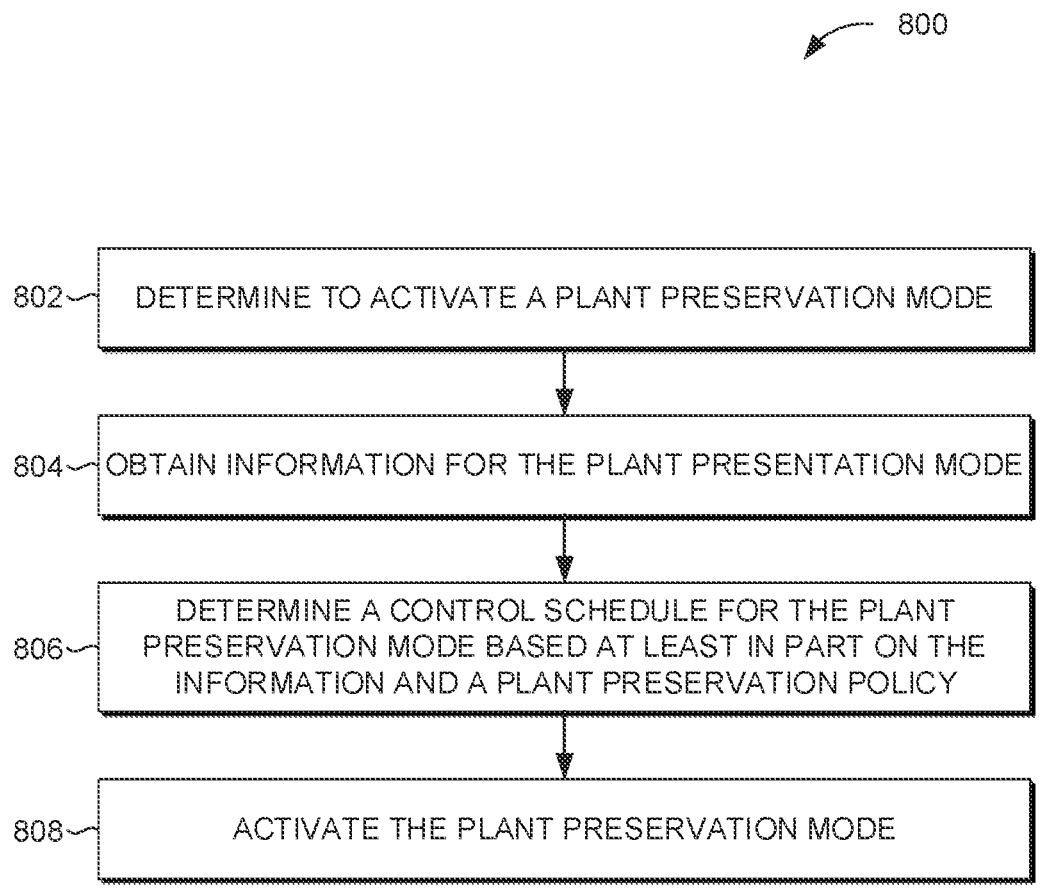
FIG. 8 is a flow diagram illustrative of an example of a routine for activating a plant-preservation mode in a plant-growing system.

FIG. 8 is a flow diagram illustrative of an example of a routine for activating a plant-preservation mode in a plant-growing system, such as the plant-growing system 100, 200, or 302 of FIG. 1, 2, or 3, respectively. One skilled in the relevant art will appreciate that the elements outlined for routine 800 can be implemented by one or more computing devices, such as the controller 324 of FIG. 3. Routine 800 has been logically associated as being generally performed by the controller 324. However, the following illustrative example should not be construed as limiting. Furthermore, it will be understood that the various blocks described herein with reference to FIG. 8 can be implemented in a variety of orders. For example, the controller 324 can implement some blocks concurrently or change the order as desired. Furthermore, it will be understood that fewer, more, or different blocks can be used as part of the routine 800.

At block 802, the controller 324 determines to activate a plant-preservation mode. The determination to activate the plant-preservation mode can be based on least in part on an activation signal. For example, an activation signal can be communicated to the controller 324 based on a user input to the plant-growing system 302 or to the application 312. For instance, a user may cause the communication of the activation signal by activating one or more buttons or switches associated with the plant-growing system 302 or the client device 306.

In some cases, the determination to activate the plant-preservation mode is based on least in part on a determination or prediction that an individual is or will become unavailable. For example, the controller 324 may obtain vacation or travel data from an individual, such as via the application 312. In some cases, an individual enters a start time or date, a duration, or an end time or date of a planned vacation or unavailability. As another example, the individual provides an indication to activate or deactivate the plant-preservation mode right away, or at a particular date or time.

In some cases, the controller 324 can predict that the user will be unavailable and can determine to activate the plant-preservation mode based on this prediction. For example, the individual may have a flight or other event scheduled in the individual's calendar. The controller 324 may reference such calendar data to determine the anticipated duration, start time, return time, etc. The controller 324 may use this data to predict unavailability for the corresponding duration. In some cases, the controller 324 may respond dynamically to changes in the user's calendar. For example, continuing with the flight example, if the user's flight schedule is changed, the controller 324 may adjust the predicted duration for the unavailability accordingly.

Furthermore, in some cases, the controller 324 may predict unavailability based on the location of the client device 306. For example, the client device 306 may include a location tracking application to which the controller 324 has access or with which the controller 324 has communication capabilities. In some such cases, the controller 324 can monitor or determine the location of the individual based on the location of the client device 306 and can predict unavailability based on the individual's location. For example, based on a determination that the individual is a threshold distance away (for example, 200 miles) from the plant-growing system 302, the controller 324 can predict that the individual is unavailable and in response can activate (or continue implementing) the plant-preservation mode. The controller 324 may continue to monitor the location of the client device 306 to predict when the individual is coming home and thus when to deactivate the plant-preservation mode. For example, based on a determination that the individual is within a threshold distance (for example, 100 miles) from the plant-growing system 302, the controller 324 can predict that the individual will be available within a particular time frame (for example, by that day or the next day), and may deactivate the plant-preservation mode accordingly.

The determination to activate the plant-preservation mode can be based on one or more stored computer executable instructions. For example, the data store 326 can store computer executable instructions that, when executed by the controller 324, cause the controller 324 to determine to activate a plant-preservation mode.

In some cases, the determination to activate the plant-preservation mode is based on a schedule, policy, or algorithm. For example, a time-based schedule may be used so that controller 324 determines to activate the plant-preservation mode every X number of days, or every X weeks, and so forth. In some cases, the determination to activate the plant-preservation mode controller 324 includes a determination to transition from or deactivate another mode, such as a plant-growing mode.

At block 804, the controller 324 obtains data for the plant-preservation mode. The data for the plant-preservation mode can vary. For example, the data can include, but is not limited to, unavailability data, plant-growing system data, or plant information. The unavailability data can include data identifying an unavailability of a user, such as vacation, a reservation, a sleep schedule, an injury, an appointment, etc. For example, the unavailability data can include a start time, start date, end time, end date, duration, location, or the like.

The plant-growing system data can include data relating to the plant-growing system 302. In some cases, the plant-growing system data can include sensor data from the sensor system 316. The plant-growing system data can include, but is not limited to, data relating to temperature, a humidity, liquid levels, pH, or other sensor data. In some cases, the plant-growing system data can include power data, such as a battery charge level or capacity associated with the power system 320, a past power consumption rate, an expected power consumption rate, etc. In some cases, the power data can be determined based on historical or common usage. In some cases, the plant-growing system data includes data relating to a currently implemented control schedule, such as a currently implemented lighting schedule or watering schedule.

The plant information can include data relating to the plants of the plant-growing system data. For example, plant information can a species name, expected-time-to-sprout data, expected-time-to-mature data, expected harvesting period data, expected aesthetically pleasing period data, liquid consumption data, harvest indicator data, as an amount of liquid in the tank 138, a past liquid consumption by the plants of the planting system, a projected liquid consumption, etc. In some cases, the controller 324 can obtain the plant information by implementing one or more blocks of routine 700 of FIG. 7.

At block 806, the controller 324 generates a control schedule based on the data for the plant-preservation mode and a plant preservation policy. As described herein, the control schedule can include a lighting schedule, a watering schedule, an imaging schedule, etc.

The plant preservation policy can indicate how to determine or generate the control schedule for the plant-preservation mode. In some implementations, the plant preservation policy indicates to coordinate a watering schedule with a lighting schedule such that the watering system 310 is active concurrently when the lighting system 330 is active. For example, consider a scenario in which the plant preservation policy indicates that that there are 25 lighting periods in a 24-hr period, where the 25 lighting periods include one twelve-hour lighting period of 0% duty cycle and further include 24 consecutive thirty-minute lighting periods with 100% intensity and 33% duty cycle (active for first 10 consecutive minutes of the 30 minute period). Furthermore, the plant preservation policy further indicates that there are two twelve-hour watering periods, each having a 5/720 duty cycle (active 5 consecutive minutes of the twelve hours). In such a scenario, the watering system 310 is active for 5 minutes and the lighting system 330 is active for 10 minutes. Accordingly, the plant preservation policy can indicate that the 5-minute activation of the watering system 110 should take place during the 10-minute activation of the lighting system 330.

In some implementations, the plant preservation policy indicates to coordinate a watering schedule with a lighting schedule such that the watering system 310 is not concurrently active when the lighting system 330 is active. For instance, continuing with the above example, the watering system 310 is active for 5 minutes and the lighting system 330 is active for 10 minutes. Accordingly, to coordinate the watering schedule with the lighting schedule such that the watering system 310 is not concurrently active when the lighting system 330, the plant preservation policy can indicate that the 5-minute activation of the watering system 110 should not take place during any portion of the 10-minute activation of the lighting system 330.

In some implementations, the plant preservation policy indicates to generate the control schedule using particular parameters. For example, the plant preservation policy may indicate to generate the lighting schedule using particular lighting parameters, such as one or more of X % light intensity, Y % duty cycle, or a period of Z number of seconds or Z minute(s), etc. As another example, the plant preservation policy may indicate to generate the watering schedule using particular watering parameters, such as such as B % duty cycle or a period of C number of seconds or C minute(s), etc. In some cases, the particular parameters is selected from a database based on the data for the plant-preservation mode.

In some implementations, the plant preservation policy indicates to generate the control schedule based on a relative change to an existing or presently active schedule. For example, the plant preservation policy may indicate to adjust an active lighting schedule by modifying at least one of the light intensity, the duty cycle, or the period. For example, in some cases, to transition from plant-growing mode to plant-preservation mode, the controller can reduce the duration of one or more lighting periods, reduce the duty cycle of one or more lighting periods, increasing the quantity of lighting periods over a particular block of time, and/or increase average intensity of light when the lighting system is active.

In some implementations, the plant preservation policy indicates to generate the control schedule based on data associated with an unavailability of the operator of the plant-growing system 302. For example, the plant preservation policy can indicate to generate the control schedule based on the duration of the unavailability. In this way, the controller 324 can cause the one or more plants to grow more slowly during the unavailability. For example, in some cases, the plant preservation policy indicates to generate the control schedule based on the timing data associated with the unavailability. As an example, based on a determination that the user is on vacation for two weeks, the plant-preservation mode can be activated for the two weeks associated with the vacation.

For example, based on a determination that the unavailability is relatively short (for example, 2, 3, 5, or 7 days), the plant preservation policy can indicate to generate a control schedule that is closer to the plant growing mode control schedule (for example, increase the duration of one or more lighting periods, increase the duty cycle of one or more lighting periods, decrease the quantity of lighting periods over a particular block of time, and/or decrease average intensity of light when the lighting system is active).

As another example, the plant preservation policy can indicate to generate the control schedule based on the plant-growing system data. For example, in some cases, the available resources (for example, liquid in the tank) may be limited. Accordingly, the plant preservation policy can indicate to determine the amount of a particular resource and generate the control schedule such that there is sufficient amounts of particular resource for the duration of time that the plant-preservation mode is active. In some cases, this determination is further based on other factors, such as expected resource consumption. For example, the plant preservation policy can indicate to determine the available resources and expected consumption of those resources. If the expected consumption of the resources during duration of time that the plant-preservation mode is active does not exceed the available resources, then the plant preservation policy can indicate to provide the resources in accordance with their expected consumption. In contrast, if the expected consumption of the resources during duration of time that the plant-preservation mode is active exceeds the available resources, then the plant preservation policy can indicate to provide fewer resources are used than what is available. By rationing the resources for the duration of the plant-preservation mode, the controller 324 increases the likelihood that the plants are alive at the end of plant-preservation mode, at which time the resources can be replenished by an operator of the plant-growing system 302.

As another example, the plant preservation policy can indicate to determine the control schedule based on the plant information. In some cases, the number, type, size, or development stage of the plants in the plant-growing system 302 may affect the particulars of the control schedule. For example, the plant preservation policy may indicate to provide a particular amount of light or liquid to the plants, based on the number, type, size, or development stage of the plants. The size or development stage of the plants can be determined in a variety of ways. For example, as described herein, the controller 324 can use a combination of plant imaging, water consumption, and timeline data to estimate a size or development stage of the plants. In some cases, the plant preservation policy indicates to increase or decrease a severity of the plant preservation mode based on the plant information. For example, when the plant information indicates that the plants are mature, or close to maturity, the plant preservation policy can indicate to enter an 'extreme' plant preservation mode (as compared to a 'normal' plant preservation mode), where the controller 324 further modifies the control schedule to further increase the duration of one or more lighting periods, increase the duty cycle of one or more lighting periods, decrease the quantity of lighting periods over a particular block of time, and/or decrease average intensity of light when the lighting system is active. In this way, plants that are mature, or close to maturity, will grow even more slowly. Alternatively, when the plant information indicates that the plants are sprouts or not close to maturity, the plant preservation policy can indicates can indicate to enter an 'moderate' plant preservation mode (as compared to a 'normal' plant preservation mode), where the controller 324 further modifies the control schedule to slightly decrease the duration of one or more lighting periods, decrease the duty cycle of one or more lighting periods, increase the quantity of lighting periods over a particular block of time, and/or increase average intensity of light when the lighting system is active. In this way, plants that are not close to maturity may grow a little faster, but not a quickly as in plant-growing mode.

It will be understood that the plant preservation policy can indicate any one or any combination of the aforementioned techniques for generating the control schedule. Furthermore, it will be understood that the control schedule can include a lighting schedule, a watering schedule, or combination thereof.

At block 808, the controller 324 implements the control schedule to activate the plant-preservation mode. In some cases, to activate the plant-preservation mode, the controller transitions from a plant-growing mode. As described herein, as compared to a plant-growing mode, a plant-preservation mode can cause the light source to operate at a lower duty cycle or over a shorter duty cycle period. For example, in plant-growing mode, the light source may alternate sequentially between being active for ten hours and inactive for two hours (or 83.33% duty cycle and twelve hour period). In contrast, in plant-preservation mode, the light source may alternate sequentially between being active for ten minutes and inactive for twenty minutes (or 33.33% duty cycle and 30 minute period).

The routine 800 can be performed multiple times, such as one or more times each time an unavailability is determined. In this way, the plant-preservation mode can continuously, periodically, or dynamically updated vary based on the particular unavailability of the user, as well as the resources of the plant-growing system 302. In some such cases, the routine 800 can include fewer, more, or different blocks. For example, in some cases, routine 800 can be performed to transition from plant-preservation mode to plant-growing mode, or another mode.

In some cases, the transition from the plant-preservation mode to the plant-growing mode, or plant-growing mode to plant-preservation mode, occurs gradually or systematically. A systematic change in the duty cycle or period can include a gradual or controlled increase or decrease. In some cases, the change can be a uniform change. In certain cases, the systematic change can be a non-uniform change. In some cases, the systematic change follows a stepwise pattern. For example, the duty cycle of the light source can be increased or decreased in a stepwise pattern from a duty cycle of a first mode to a duty cycle of a second mode, for example, including 5, 8, 10, 12, 15, or 20 "steps" or discrete points in the stepwise pattern. In some cases, the systematic change, such as the stepwise pattern, corresponds to a simple exponential curve, an S-shaped exponential curve, or a J-shaped exponential curve.

EXAMPLES

Various examples of systems relating to a plant-growing system are found in the following clauses:

Clause 1. A plant-growing system, comprising:
a planting system configured to hold one or more plants;
a lighting system comprising a light source configured to emit light;
a watering system configured to communicate liquid to the planting system; and
a controller communicatively coupled with the lighting system and the watering system, the controller configured to operate in a plant-growing mode during a first period of time and operate in a plant-preservation mode during a second period of time, wherein in the plant-preservation mode the controller is configured to control the lighting system and the watering system to cause the one or more plants to grow more slowly than in the plant-growing mode.

Clause 2. The plant-growing system of clause 1, in the plant-preservation mode, the controller controls the lighting system and the watering system according to a plant preservation control schedule.

Clause 3. The plant-growing system of clause 2, wherein the plant preservation control schedule comprises a watering schedule and a lighting schedule, wherein to control the lighting system and the watering system according to the plant preservation control schedule, the controller is configured to control the lighting system according to the lighting schedule and control the watering system according to the watering schedule.

Clause 4. The plant-growing system of clause 3, wherein the lighting schedule indicates when and for how long to activate the lighting system, and wherein the watering schedule indicates when and for how long to activate the watering system.

Clause 5. The plant-growing system of clause 4, wherein the lighting schedule indicates a plurality of lighting periods, wherein each lighting period of the plurality of lighting periods is associated with a particular duration of time and a particular duty cycle over which to activate the lighting system during the particular duration of time.

Clause 6. The plant-growing system of clause 5, wherein the lighting schedule indicates a light intensity associated with each lighting period of the plurality of lighting periods.

Clause 7. The plant-growing system of any of clauses 4 to 6, wherein the watering schedule indicates a plurality of watering periods, wherein each watering period of the plurality of watering periods is associated with a particular duration of time and a particular duty cycle over which to activate the watering system during the particular duration of time.

Clause 8. The plant-growing system of any of clauses 2 to 7, wherein the controller is further configured to generate the plant preservation control schedule, wherein to generate the plant preservation control schedule, the controller is configured to:
receive data associated with the plant-preservation mode;
generate the plant preservation control schedule based on the data for the plant-preservation mode and a plant preservation policy.

Clause 9. The plant-growing system of clause 8, wherein the plant preservation policy indicates to coordinate a watering schedule with a lighting schedule such that the watering system is active concurrently when the lighting system is active.

Clause 10. The plant-growing system of any of clauses 8 or 9, wherein the data associated with the plant-preservation mode comprises an expected duration of an unavailability of an individual, an amount of the liquid in a tank of the plant-growing system, and a liquid consumption rate of the one or more plants.

Clause 11. The plant-growing system of any of clauses 8 to 10, wherein data associated with the plant-preservation mode comprises an indication of timing information relating to an unavailability of an individual, wherein the timing information comprising at least one of a start time, end time, or expected duration of the unavailability.

Clause 12. The plant-growing system of any of clauses 8 to 11, wherein according to the plant preservation policy, in the plant-preservation mode, the controller is further configured to activate the watering system to provide liquid to the planting system at an approximately equal rate during an expected duration of an unavailability of an individual.

Clause 13. The plant-growing system of clause 12, wherein the unavailability of the individual corresponds to the individual being a threshold distance away from the plant-growing system.

Clause 14. The plant-growing system of any of clauses 8 to 13, wherein the data associated with the plant-preservation mode comprises at least one of a number, type, or development stage of at least one of the one or more plants, and wherein according to the plant preservation policy, in the plant-preservation mode, the controller is further configured to control the lighting system and the watering system based on the at least one of the number, type, or development stage of the at least one of the one or more plants.

Clause 15. The plant-growing system of any of clauses 8 to 14, wherein the data associated with the plant-preservation mode comprises an indication of a rate of liquid consumed by the one or more plants during the first period of time, and wherein according to the plant preservation policy, in the plant-preservation mode, the controller is further configured to control the lighting system and the watering system based on the rate of liquid consumed by the one or more plants during the first period of time.

Clause 16. The plant-growing system of any of clauses 8 to 15, wherein the data associated with the plant-preservation mode comprises an amount of liquid remaining in the watering system, and wherein according to the plant preservation policy, in the plant-preservation mode, the controller is further configured to control the lighting system and the watering system based on the amount of liquid remaining in the watering system.

Clause 17. The plant-growing system of any of the preceding clauses, wherein in the plant-preservation mode, the controller is configured to control the lighting system to provide a first quantity of first distinct lighting periods within a block of time and in the plant-growing mode, the controller is configured to control the lighting system to provide a second quantity of second distinct lighting periods within the block of time, wherein the first quantity is greater than the second quantity, and wherein each of the first distinct lighting periods and the second distinct lighting periods comprises an activation of the lighting system and a deactivation of the lighting system.

Clause 18. The plant-growing system of any of the preceding clauses, wherein in the plant-preservation mode, the controller is configured to control the lighting system to provide a plurality of first lighting periods within a block of time, wherein in the plant-growing mode, the controller is configured to control the lighting system to provide a plurality of second lighting periods within the block of time, wherein each of the first lighting periods is shorter in duration than each of the second lighting periods, and wherein each of the first lighting periods has a lower duty cycle than each of the second lighting periods.

Clause 19. The plant-growing system of any of the preceding clauses, wherein in the plant-preservation mode, the controller is configured to activate the lighting system for a first amount of time within a block of time, and wherein in the plant-growing mode, the controller is configured to activate the lighting system for a second amount of time within the block of time that is greater than the first amount of time.

Clause 20. The plant-growing system of any of the preceding clauses, wherein in the plant-preservation mode, the controller is configured to control the lighting system to provide a first daily light integral that is smaller than a second daily integral provided in the plant-growing mode.

Clause 21. The plant-growing system of any of the preceding clauses, wherein in the plant-preservation mode, the controller is configured to control the lighting system to provide an average intensity of light, when the lighting system is active, that is higher than an average intensity of light, when the lighting system is active, provided in the plant-growing mode.

Clause 22. The plant-growing system of any of the preceding clauses, wherein in the plant-preservation mode the controller is configured to control the watering system to provide a first amount of the liquid to the planting system within a block of time that is less than a second amount of the liquid provided to the planting system within the block of time in the plant-growing mode.

Clause 23. The plant-growing system of any of the preceding clauses, wherein in the plant-preservation mode, the controller is configured to activate the watering system for a first amount of time within a block of time, and wherein in the plant-growing mode, the controller is configured to activate the watering system for a second amount of time within the block of time that is greater than the first amount of time.

Clause 24. The plant-growing system of any of the preceding clauses, where the controller activates the plant-preservation mode based on a request to activate the plant-preservation mode from a client device.

Clause 25. The plant-growing system of any of the preceding clauses, wherein the controller is configured to transition from the plant-growing mode to the plant-preservation mode based on a request to activate the plant-preservation mode from a client device Clause 26. The plant-growing system of any of the preceding clauses, wherein the controller is configured to transition from the plant-growing mode to the plant-preservation mode based on a determined unavailability of a user associated with the plant-growing system.

Clause 27. The plant-growing system of any of the preceding clauses, wherein the controller is configured to transition from the plant-growing mode to the plant-preservation mode based on a determination that a user associated with the plant-growing system is a threshold distance away from the plant-growing system.

Clause 28. The plant-growing system of any of the preceding clauses, wherein the controller is further configured to:
predict an unavailability of a user; and
activate the plant-preservation mode based on the predicted unavailability of the user.

Clause 29. The plant-growing system of clause 28, wherein to predict the unavailability of the user, the controller is configured to:
obtain calendar information;
parse the calendar information to determine when a user is scheduled to be greater than a threshold distance away from the plant-growing system.

Clause 30. The plant-growing system of any of the preceding clauses, wherein the controller is further configured to:
transition from the plant-growing mode to the plant-preservation mode by at least one of transitioning a duty cycle of the light source from a first duty cycle associated with the plant-growing mode to a second duty cycle associated with the plant-preservation mode or transitioning a period of the duty cycle of the light source from a first period associated with the plant-growing mode to a second period associated with the plant-preservation mode.

Clause 31. The plant-growing system of clause 30, wherein the first duty cycle is smaller than the second duty cycle, wherein the first period is smaller than the second period.

Clause 32. The plant-growing system of any of the preceding clauses, the controller is further configured to:

transition from the plant-preservation mode to the plant-growing mode to the plant-preservation mode by at least one of transitioning a duty cycle of light source from a first duty cycle associated with the plant-preservation mode to a second duty cycle associated with the plant-growing mode or transitioning a period of the duty cycle of the light source from a first period associated with the plant-preservation mode to a second period associated with the plant-growing mode.

Clause 33. The plant-growing system of clause 32, wherein the first duty cycle is smaller than the second duty cycle, wherein the first period is smaller than the second period.

Clause 34. The plant-growing system of any of clauses 32 or 33, wherein the controller is configured to transition the duty cycle of the light source from the first duty cycle to the second duty cycle according to at least one of a stepwise pattern, a simple exponential curve, an S-shaped exponential curve, or a J-shaped exponential curve.

Clause 35. The plant-growing system of any of clauses 32 to 34, wherein the controller is configured to transition the period of the duty cycle of the light source from the first period to the second period according to at least one of a stepwise pattern, a simple exponential curve, an S-shaped exponential curve, or a J-shaped exponential curve.

Clause 36. The plant-growing system of any of the preceding clauses, wherein the first period of time and the second period of time do not overlap.

Clause 37. The plant-growing system of any of the preceding clauses, wherein the controller is further configured to generate a plant preservation control schedule for the plant-preservation mode, wherein in the plant-preservation mode the controller controls the lighting system and the watering system according to a plant preservation control schedule.

Clause 38. The plant-growing system of any of the preceding clauses, further comprising a tank configured to store the liquid, wherein the watering system is configured to communicate liquid from the tank to the planting system.

Various examples of non-transitory computer-readable storage medium storing computer-executable instructions relating to a plant-growing system are found in the following clauses:

Clause 1. A non-transitory computer-readable storage medium storing computer-executable instructions that when executed by one or more processors cause the one or more processors to:

operate in a plant-growing mode during a first period of time and operate in a plant-preservation mode during a second period of time, wherein in the plant-preservation mode the computer-executable instructions cause the one or more processors to control a lighting system and a watering system to cause one or more plants to grow more slowly than in the plant-growing mode, wherein a planting system is configured to hold the one or more plants, wherein the watering system is configured to communicate liquid to the planting system, and wherein the lighting system comprises a light source configured to emit light.

Clause 2. The non-transitory computer-readable storage medium of clause 1, in the plant-preservation mode, the computer-executable instructions cause the one or more processors to control the lighting system and the watering system according to a plant preservation control schedule.

Clause 3. The non-transitory computer-readable storage medium of clause 2, wherein the plant preservation control schedule comprises a watering schedule and a lighting schedule, wherein to control the lighting system and the watering system according to the plant preservation control schedule, the computer-executable instructions cause the one or more processors to control the lighting system according to the lighting schedule and control the watering system according to the watering schedule.

Clause 4. The non-transitory computer-readable storage medium of clause 3, wherein the lighting schedule indicates when and for how long to activate the lighting system, and wherein the watering schedule indicates when and for how long to activate the watering system.

Clause 5. The non-transitory computer-readable storage medium of clause 4, wherein the lighting schedule indicates a plurality of lighting periods, wherein each lighting period of the plurality of lighting periods is associated with a particular duration of time and a particular duty cycle over which to activate the lighting system during the particular duration of time.

Clause 6. The non-transitory computer-readable storage medium of clause 5, wherein the lighting schedule indicates a light intensity associated with each lighting period of the plurality of lighting periods.

Clause 7. The non-transitory computer-readable storage medium of any of clauses 4 to 6, wherein the watering schedule indicates a plurality of watering periods, wherein each watering period of the plurality of watering periods is associated with a particular duration of time and a particular duty cycle over which to activate the watering system during the particular duration of time.

Clause 8. The non-transitory computer-readable storage medium of any of clauses 2 to 7, wherein the computer-executable instructions further cause the one or more processors to generate the plant preservation control schedule, wherein to generate the plant preservation control schedule, the computer-executable instructions cause the one or more processors to:

receive data associated with the plant-preservation mode;

generate the plant preservation control schedule based on the data for the plant-preservation mode and a plant preservation policy.

Clause 9. The non-transitory computer-readable storage medium of clause 8, wherein the plant preservation policy indicates to coordinate a watering schedule with a lighting schedule such that the watering system is active concurrently when the lighting system is active.

Clause 10. The non-transitory computer-readable storage medium of any of clauses 8 or 9, wherein the data associated with the plant-preservation mode comprises an expected duration of an unavailability of an individual, an amount of the liquid in a tank of a plant-growing system, and a liquid consumption rate of the one or more plants.

Clause 11. The non-transitory computer-readable storage medium of any of clauses 8 to 10, wherein data associated with the plant-preservation mode comprises an indication of timing information relating to an unavailability of an individual, wherein the timing information comprising at least one of a start time, end time, or expected duration of the unavailability.

Clause 12. The non-transitory computer-readable storage medium of any of clauses 8 to 11, wherein according to the plant preservation policy, in the plant-preservation mode, the computer-executable instructions cause the one or more processors to activate the watering system to provide liquid to the planting system at an approximately equal rate during an expected duration of an unavailability of an individual.

Clause 13. The non-transitory computer-readable storage medium of clause 12, wherein the unavailability of the individual corresponds to the individual being a threshold distance away from a plant-growing system.

Clause 14. The non-transitory computer-readable storage medium of any of clauses 8 to 13, wherein the data associated with the plant-preservation mode comprises at least one of a number, type, or development stage of at least one of the one or more plants, and wherein according to the plant preservation policy, in the plant-preservation mode, the computer-executable instructions cause the one or more processors to control the lighting system and the watering system based on the at least one of the number, type, or development stage of the at least one of the one or more plants.

Clause 15. The non-transitory computer-readable storage medium of any of clauses 8 to 14, wherein the data associated with the plant-preservation mode comprises an indication of a rate of liquid consumed by the one or more plants during the first period of time, and wherein according to the plant preservation policy, in the plant-preservation mode, the computer-executable instructions cause the one or more processors to control the lighting system and the watering system based on the rate of liquid consumed by the one or more plants during the first period of time.

Clause 16. The non-transitory computer-readable storage medium of any of clauses 8 to 15, wherein the data associated with the plant-preservation mode comprises an amount of liquid remaining in the watering system, and wherein according to the plant preservation policy, in the plant-preservation mode, the computer-executable instructions cause the one or more processors to control the lighting system and the watering system based on the amount of liquid remaining in the watering system.

Clause 17. The non-transitory computer-readable storage medium of any of the preceding clauses, wherein in the plant-preservation mode, the computer-executable instructions cause the one or more processors to control the lighting system to provide a first quantity of first distinct lighting periods within a block of time and in the plant-growing mode, the computer-executable instructions cause the one or more processors to control the lighting system to provide a second quantity of second distinct lighting periods within the block of time, wherein the first quantity is greater than the second quantity, and wherein each of the first distinct lighting periods and the second distinct lighting periods comprises an activation of the lighting system and a deactivation of the lighting system.

Clause 18. The non-transitory computer-readable storage medium of any of the preceding clauses, wherein in the plant-preservation mode, the computer-executable instructions cause the one or more processors to control the lighting system to provide a plurality of first lighting periods within a block of time, wherein in the plant-growing mode, the computer-executable instructions cause the one or more processors to control the lighting system to provide a plurality of second lighting periods within the block of time, wherein each of the first lighting periods is shorter in duration than each of the second lighting periods, and wherein each of the first lighting periods has a lower duty cycle than each of the second lighting periods.

Clause 19. The non-transitory computer-readable storage medium of any of the preceding clauses, wherein in the plant-preservation mode, the computer-executable instructions cause the one or more processors to activate the lighting system for a first amount of time within a block of time, and wherein in the plant-growing mode, the computer-executable instructions cause the one or more processors to activate the lighting system for a second amount of time within the block of time that is greater than the first amount of time.

Clause 20. The non-transitory computer-readable storage medium of any of the preceding clauses, wherein in the plant-preservation mode, the computer-executable instructions cause the one or more processors to control the lighting system to provide a first daily light integral that is smaller than a second daily integral provided in the plant-growing mode.

Clause 21. The non-transitory computer-readable storage medium of any of the preceding clauses, wherein in the plant-preservation mode, the computer-executable instructions cause the one or more processors to control the lighting system to provide an average intensity of light, when the lighting system is active, that is higher than an average intensity of light, when the lighting system is active, provided in the plant-growing mode.

Clause 22. The non-transitory computer-readable storage medium of any of the preceding clauses, wherein in the plant-preservation mode the computer-executable instructions cause the one or more processors to control the watering system to provide a first amount of the liquid to the planting system within a block of time that is less than a second amount of the liquid provided to the planting system within the block of time in the plant-growing mode.

Clause 23. The non-transitory computer-readable storage medium of any of the preceding clauses, wherein in the plant-preservation mode, the computer-executable instructions cause the one or more processors to activate the watering system for a first amount of time within a block of time, and wherein in the plant-growing mode, the computer-executable instructions cause the one or more processors to activate the watering system for a second amount of time within the block of time that is greater than the first amount of time.

Clause 24. The non-transitory computer-readable storage medium of any of the preceding clauses, where the computer-executable instructions cause the one or more processors to activates the plant-preservation mode based on a request to activate the plant-preservation mode from a client device.

Clause 25. The non-transitory computer-readable storage medium of any of the preceding clauses, wherein the computer-executable instructions cause the one or more processors to transition from the plant-growing mode to the plant-preservation mode based on a request to activate the plant-preservation mode from a client device Clause 26. The non-transitory computer-readable storage medium of any of the preceding clauses, wherein the computer-executable instructions cause the one or more processors to transition from the plant-growing mode to the plant-preservation mode based on a determined unavailability of a user associated with a plant-growing system.

Clause 27. The non-transitory computer-readable storage medium of any of the preceding clauses, wherein the computer-executable instructions cause the one or more processors to transition from the plant-growing mode to the plant-preservation mode based on a determination that a user associated with a plant-growing system is a threshold distance away from the plant-growing system.

Clause 28. The non-transitory computer-readable storage medium of any of the preceding clauses, wherein the computer-executable instructions cause the one or more processors to:
  predict an unavailability of a user; and
  activate the plant-preservation mode based on the predicted unavailability of the user.

Clause 29. The non-transitory computer-readable storage medium of clause 28, wherein to predict the unavailability of the user, the computer-executable instructions cause the one or more processors to:
  obtain calendar information;
  parse the calendar information to determine when a user is scheduled to be greater than a threshold distance away from a plant-growing system.

Clause 30. The non-transitory computer-readable storage medium of any of the preceding clauses, wherein the computer-executable instructions cause the one or more processors to:
  transition from the plant-growing mode to the plant-preservation mode by at least one of transitioning a duty cycle of the light source from a first duty cycle associated with the plant-growing mode to a second duty cycle associated with the plant-preservation mode or transitioning a period of the duty cycle of the light source from a first period associated with the plant-growing mode to a second period associated with the plant-preservation mode.

Clause 31. The non-transitory computer-readable storage medium of clause 30, wherein the first duty cycle is smaller than the second duty cycle, wherein the first period is smaller than the second period.

Clause 32. The non-transitory computer-readable storage medium of any of the preceding clauses, wherein the computer-executable instructions cause the one or more processors to:
  transition from the plant-preservation mode to the plant-growing mode to the plant-preservation mode by at least one of transitioning a duty cycle of light source from a first duty cycle associated with the plant-preservation mode to a second duty cycle associated with the plant-growing mode or transitioning a period of the duty cycle of the light source from a first period associated with the plant-preservation mode to a second period associated with the plant-growing mode.

Clause 33. The non-transitory computer-readable storage medium of clause 32, wherein the first duty cycle is smaller than the second duty cycle, wherein the first period is smaller than the second period.

Clause 34. The non-transitory computer-readable storage medium of any of clauses 32 or 33, wherein the computer-executable instructions cause the one or more processors to transition the duty cycle of the light source from the first duty cycle to the second duty cycle according to at least one of a stepwise pattern, a simple exponential curve, an S-shaped exponential curve, or a J-shaped exponential curve.

Clause 35. The non-transitory computer-readable storage medium of any of clauses 32 to 34, wherein the computer-executable instructions cause the one or more processors to transition the period of the duty cycle of the light source from the first period to the second period according to at least one of a stepwise pattern, a simple exponential curve, an S-shaped exponential curve, or a J-shaped exponential curve.

Clause 36. The non-transitory computer-readable storage medium of any of the preceding clauses, wherein the first period of time and the second period of time do not overlap.

Clause 37. The non-transitory computer-readable storage medium of any of the preceding clauses, wherein the computer-executable instructions cause the one or more processors to generate a plant preservation control schedule for the plant-preservation mode, wherein in the plant-preservation mode the computer-executable instructions cause the one or more processors to control the lighting system and the watering system according to a plant preservation control schedule.

Clause 38. The non-transitory computer-readable storage medium of any of the preceding clauses, wherein the watering system comprises a tank configured to store the liquid, wherein the watering system is configured to communicate liquid from the tank to the planting system.

Various examples of methods relating to a plant-growing system are found in the following clauses:

Clause 1. A method comprising:
  operating a lighting system of a plant growing system and a watering system of the plant growing system in a plant-growing mode during a first period of time,
  wherein the watering system is configured to communicate liquid to a planting system,
  wherein the planting system is configured to hold one or more plants, and
  wherein the lighting system comprises a light source configured to emit light; and
  operating the lighting system and the watering system in a plant-preservation mode during a second period of time, wherein said operating in the plant-preservation mode comprises controlling the lighting system and the watering system to cause the one or more plants to grow more slowly than in the plant-growing mode.

Clause 2. The method of clause 1, further comprising, in the plant-preservation mode, controlling the lighting system and the watering system according to a plant preservation control schedule.

Clause 3. The method of clause 2, wherein the plant preservation control schedule comprises a watering schedule and a lighting schedule, wherein said controlling the lighting system and the watering system according to the plant preservation control schedule comprises controlling the lighting system according to the lighting schedule and control the watering system according to the watering schedule.

Clause 4. The method of clause 3, wherein the lighting schedule indicates when and for how long to activate the lighting system, and wherein the watering schedule indicates when and for how long to activate the watering system.

Clause 5. The method of clause 4, wherein the lighting schedule indicates a plurality of lighting periods, wherein each lighting period of the plurality of lighting periods is associated with a particular duration of time and a particular duty cycle over which to activate the lighting system during the particular duration of time.

Clause 6. The method of clause 5, wherein the lighting schedule indicates a light intensity associated with each lighting period of the plurality of lighting periods.

Clause 7. The method of any of clauses 4 to 6, wherein the watering schedule indicates a plurality of watering periods, wherein each watering period of the plurality of watering periods is associated with a particular duration of time and a particular duty cycle over which to activate the watering system during the particular duration of time.

Clause 8. The method of any of clauses 2 to 7, further comprising generating the plant preservation control schedule, said generating the plant preservation control schedule comprises:

receiving data associated with the plant-preservation mode; and generating the plant preservation control schedule based on the data for the plant-preservation mode and a plant preservation policy.

Clause 9. The method of clause 8, wherein the plant preservation policy indicates to coordinate a watering schedule with a lighting schedule such that the watering system is active concurrently when the lighting system is active.

Clause 10. The method of any of clauses 8 or 9, wherein the data associated with the plant-preservation mode comprises an expected duration of an unavailability of an individual, an amount of the liquid in a tank of a plant-growing system, and a liquid consumption rate of the one or more plants.

Clause 11. The method of any of clauses 8 to 10, wherein data associated with the plant-preservation mode comprises an indication of timing information relating to an unavailability of an individual, wherein the timing information comprising at least one of a start time, end time, or expected duration of the unavailability.

Clause 12. The method of any of clauses 8 to 11, wherein according to the plant preservation policy, in the plant-preservation mode, the method further comprises activating the watering system to provide liquid to the planting system at an approximately equal rate during an expected duration of an unavailability of an individual.

Clause 13. The method of clause 12, wherein the unavailability of the individual corresponds to the individual being a threshold distance away from a plant-growing system.

Clause 14. The method of any of clauses 8 to 13, wherein the data associated with the plant-preservation mode comprises at least one of a number, type, or development stage of at least one of the one or more plants, and wherein according to the plant preservation policy, in the plant-preservation mode, the method further comprises controlling the lighting system and the watering system based on the at least one of the number, type, or development stage of the at least one of the one or more plants.

Clause 15. The method of any of clauses 8 to 14, wherein the data associated with the plant-preservation mode comprises an indication of a rate of liquid consumed by the one or more plants during the first period of time, and wherein according to the plant preservation policy, in the plant-preservation mode, the method further comprises controlling the lighting system and the watering system based on the rate of liquid consumed by the one or more plants during the first period of time.

Clause 16. The method of any of clauses 8 to 15, wherein the data associated with the plant-preservation mode comprises an amount of liquid remaining in the watering system, and wherein according to the plant preservation policy, in the plant-preservation mode, the method further comprises controlling the lighting system and the watering system based on the amount of liquid remaining in the watering system.

Clause 17. The method of any of the preceding clauses, wherein in the plant-preservation mode, the method further comprises controlling the lighting system to provide a first quantity of first distinct lighting periods within a block of time and in the plant-growing mode, the method further comprises controlling the lighting system to provide a second quantity of second distinct lighting periods within the block of time, wherein the first quantity is greater than the second quantity, and wherein each of the first distinct lighting periods and the second distinct lighting periods comprises an activation of the lighting system and a deactivation of the lighting system.

Clause 18. The method of any of the preceding clauses, wherein in the plant-preservation mode, the method further comprises controlling the lighting system to provide a plurality of first lighting periods within a block of time, wherein in the plant-growing mode, the method further comprises controlling the lighting system to provide a plurality of second lighting periods within the block of time, wherein each of the first lighting periods is shorter in duration than each of the second lighting periods, and wherein each of the first lighting periods has a lower duty cycle than each of the second lighting periods.

Clause 19. The method of any of the preceding clauses, wherein in the plant-preservation mode, the method further comprises activating the lighting system for a first amount of time within a block of time, and wherein in the plant-growing mode, the method further comprises activating the lighting system for a second amount of time within the block of time that is greater than the first amount of time.

Clause 20. The method of any of the preceding clauses, wherein in the plant-preservation mode, the method further comprises controlling the lighting system to provide a first daily light integral that is smaller than a second daily integral provided in the plant-growing mode.

Clause 21. The method of any of the preceding clauses, wherein in the plant-preservation mode, the method further comprises controlling the lighting system to provide an average intensity of light, when the lighting system is active, that is higher than an average intensity of light, when the lighting system is active, provided in the plant-growing mode.

Clause 22. The method of any of the preceding clauses, wherein in the plant-preservation mode the method further comprises controlling the watering system to provide a first amount of the liquid to the planting system within a block of time that is less than a second amount of the liquid provided to the planting system within the block of time in the plant-growing mode.

Clause 23. The method of any of the preceding clauses, wherein in the plant-preservation mode, the method further comprises activating the watering system for a first amount of time within a block of time, and wherein in the plant-growing mode, the method further comprises activating the watering system for a second amount of time within the block of time that is greater than the first amount of time.

Clause 24. The method of any of the preceding clauses, where the method further comprises activating the plant-preservation mode based on a request to activate the plant-preservation mode from a client device.

Clause 25. The method of any of the preceding clauses, further comprising transitioning from the plant-growing mode to the plant-preservation mode based on a request to activate the plant-preservation mode from a client device Clause 26. The method of any of the preceding clauses, further comprising transitioning from the plant-growing mode to the plant-preservation mode based on a determined unavailability of a user associated with a plant-growing system.

Clause 27. The method of any of the preceding clauses, further comprising transitioning from the plant-growing mode to the plant-preservation mode based on a determination that a user associated with a plant-growing system is a threshold distance away from the plant-growing system.

Clause 28. The method of any of the preceding clauses, further comprising:
predicting an unavailability of a user; and
activating the plant-preservation mode based on the predicted unavailability of the user.

Clause 29. The method of clause 28, wherein said predicting the unavailability of the user comprises:
obtaining calendar information; and
parsing the calendar information to determine when a user is scheduled to be greater than a threshold distance away from a plant-growing system.

Clause 30. The method of any of the preceding clauses, further comprising:
transitioning from the plant-growing mode to the plant-preservation mode by at least one of transitioning a duty cycle of the light source from a first duty cycle associated with the plant-growing mode to a second duty cycle associated with the plant-preservation mode or transitioning a period of the duty cycle of the light source from a first period associated with the plant-growing mode to a second period associated with the plant-preservation mode.

Clause 31. The method of clause 30, wherein the first duty cycle is smaller than the second duty cycle, wherein the first period is smaller than the second period.

Clause 32. The method of any of the preceding clauses, further comprising:
transitioning from the plant-preservation mode to the plant-growing mode to the plant-preservation mode by at least one of transitioning a duty cycle of light source from a first duty cycle associated with the plant-preservation mode to a second duty cycle associated with the plant-growing mode or transitioning a period of the duty cycle of the light source from a first period associated with the plant-preservation mode to a second period associated with the plant-growing mode.

Clause 33. The method of clause 32, wherein the first duty cycle is smaller than the second duty cycle, wherein the first period is smaller than the second period.

Clause 34. The method of any of clauses 32 or 33, further comprising transitioning the duty cycle of the light source from the first duty cycle to the second duty cycle according to at least one of a stepwise pattern, a simple exponential curve, an S-shaped exponential curve, or a J-shaped exponential curve.

Clause 35. The method of any of clauses 32 to 34, further comprising transitioning the period of the duty cycle of the light source from the first period to the second period according to at least one of a stepwise pattern, a simple exponential curve, an S-shaped exponential curve, or a J-shaped exponential curve.

Clause 36. The method of any of the preceding clauses, wherein the first period of time and the second period of time do not overlap.

Clause 37. The method of any of the preceding clauses, further comprising generating a plant preservation control schedule for the plant-preservation mode, wherein in the plant-preservation mode the method further comprises controlling the lighting system and the watering system according to a plant preservation control schedule.

Clause 38. The method of any of the preceding clauses, wherein the watering system comprises a tank configured to store the liquid, wherein the watering system is configured to communicate liquid from the tank to the planting system.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "and/or" in reference to a list of two or more items, covers all of the following interpretations of the word: any one of the items in the list, all of the items in the list, and any combination of the items in the list. Likewise the term "or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, non-limiting examples: through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, non-limiting examples: a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems or computing devices.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A plant-growing system, comprising:
   a planting system configured to hold a plurality of plants in a plurality of vertical columns;
   a lighting system coupled to the planting system, the lighting system comprising at least one light source configured to emit light;
   a watering system configured to store and deliver liquid to the planting system, wherein the watering system can store a quantity of liquid at and in between a maximum quantity and a minimum quantity; and a controller communicatively coupled with the lighting system and the watering system, the controller configured to:
operate in a plant-growing mode, wherein in the plant-growing mode,
the controller is configured to:
operate the lighting system according to a first lighting schedule, and
operate the watering system according to a first watering schedule,
determine a location of the plant-growing system;
determine, based on receipt of location data from a user device, a first location of the user device that is remote from the plant-growing system,
based on a determination that the first location of the user device is greater than a first predetermined threshold distance away from the location of the plant-growing system, automatically switch from the plant-growing mode to a plant-preservation mode to reduce plant growth,
wherein in the plant-preservation mode, the controller is configured to:
cause the lighting system to emit light at an average intensity that is higher than the average intensity of light emitted during the plant-growing mode,
operate the lighting system to emit light according to a second lighting schedule for less time over a period of time than during the plant-growing mode, and
operate the watering system according to a second watering schedule,
determine, based on receipt of updated location data from the user device,
a second location of the user device that is remote from the plant-growing system, and
based on a determination that the second location of the user device is less than a second predetermined threshold distance away from the plant-growing system, automatically switch from the plant-preservation mode to the plant-growing mode, wherein the first predetermined threshold distance is greater than the second predetermined threshold distance.

2. The plant-growing system of claim 1, wherein the first lighting schedule and second lighting schedule each indicate when and for how long to activate the lighting system, and wherein the first watering schedule and second watering schedule each indicate when and for how long to activate the watering system.

3. The plant-growing system of claim 1, wherein the first lighting schedule and second lighting schedule each comprises a plurality of lighting periods, wherein each lighting period of the plurality of lighting periods is associated with a particular duration of time and a particular duty cycle over which to activate the lighting system during the particular duration of time, and wherein the first lighting schedule and second lighting schedule each indicate a light intensity associated with each lighting period of the plurality of lighting periods.

4. The plant-growing system of claim 1, wherein the first watering schedule and second water schedule each comprise a plurality of watering periods, wherein each watering period of the plurality of watering periods is associated with a particular duration of time and a particular duty cycle over which to activate the watering system during the particular duration of time.

5. The plant-growing system of claim 1, wherein the controller is further configured to generate the second lighting schedule and second watering schedule, wherein to generate the second lighting schedule and second watering schedule, the controller is configured to:
receive data associated with the plant-preservation mode; and
based on the data for the plant-preservation mode and a plant preservation policy,
generate a second lighting schedule, and
generate a second watering schedule.

6. The plant-growing system of claim 5, wherein the plant preservation policy comprises coordinating a watering schedule with a lighting schedule such that the watering system is active concurrently when the lighting system is active.

7. The plant-growing system of claim 5, wherein the data associated with the plant-preservation mode comprises at least one of an expected duration of an unavailability of an individual, an amount of the liquid in a tank of the plant-growing system, and a liquid consumption rate of the plurality of plants.

8. The plant-growing system of claim 5, wherein the data associated with the plant-preservation mode comprises at least one of a number, type, or development stage of at least one of the plurality of plants, and wherein according to the plant preservation policy, in the plant-preservation mode, the controller is further configured to control the lighting system and the watering system based on the at least one of the number, type, or development stage of the at least one of the plurality of plants.

9. The plant-growing system of claim 5, wherein the data associated with the plant-preservation mode comprises an indication of a rate of liquid consumed by the plurality of plants during a first period of time, and wherein according to the plant preservation policy, in the plant-preservation mode, the controller is further configured to control the lighting system and the watering system based on the rate of liquid consumed by the plurality of plants during the first period of time.

10. The plant-growing system of claim 1, wherein in the plant-preservation mode, the controller is configured to control the watering system such that a consumption of liquid by the plurality of plants is reduced relative to a previous controller setting.

11. The plant-growing system of claim 1, wherein in the plant-preservation mode, the controller is configured to control the lighting system to provide a first daily light integral that is smaller than a second daily light integral provided in the plant-growing mode.

12. The plant-growing system of claim 1, wherein the controller is further configured to:
receive calendar data associated with the user device;
predict a duration of unavailability of a user associated with the user device based on the calendar data; and
switch from the plant-growing mode to the plant-preservation mode based on the predicted duration of unavailability of the user.

13. The plant-growing system of claim 1, wherein the controller is further configured to switch from the plant-preservation mode to the plant-growing mode to the plant-preservation mode by at least one of transitioning a duty cycle of light source from a first duty cycle associated with the plant-preservation mode to a second duty cycle associated with the plant-growing mode or transitioning a period of the duty cycle of the light source from a first period associated with the plant-preservation mode to a second period associated with the plant-growing mode, wherein the first duty cycle is smaller than the second duty cycle, wherein the first period is smaller than the second period.

14. The plant-growing system of claim 1, wherein in the plant-growing mode, the lighting system is configured to provide a first quantity of first lighting periods within a period of time, wherein in the plant-preservation mode, the lighting system is configured to provide a second quantity of second lighting periods within the period of time such that a consumption of the liquid by the plurality of plants during the plant-preservation mode is less than the consumption of the liquid by the plurality of plants during the plant-growing mode.

15. The plant-growing system of claim 14, wherein the first quantity is different than the second quantity.

16. The plant-growing system of claim 14, wherein each of the first lighting periods and the second lighting periods comprises an activation of the lighting system and a deactivation of the lighting system, wherein a duration of each of the first lighting periods is greater than the duration of each of the second lighting periods.

17. A non-transitory computer-readable storage medium storing computer-executable instructions that when executed by one or more processors cause the one or more processors to:
  operate a plant-growing system in a plant-growing mode, wherein in the plant-growing mode, the computer-executable instructions cause the one or more processors to:
    operate a lighting system coupled to the plant-growing system according to a first lighting schedule, and
    operate a watering system according to a first watering schedule,
  wherein the watering system is configured to store and deliver liquid to a planting system, wherein the watering system can store a quantity of liquid at and in between a maximum quantity and a minimum quantity,
  wherein the planting system is configured to hold a plurality of plants in a plurality of vertical columns, and
  wherein the lighting system comprises at least one light source configured to emit light;
  determine, based on receipt of location data from a user device, a first location of the user device that is remote from the plant-growing system;
  determine, a location of the plant-growing system;
  based on a determination that the first location of the user device is greater than a first predetermined threshold distance away from the location of the plant-growing system, automatically switch from the plant-growing mode to a plant-preservation mode to reduce plant growth,
    wherein in the plant-preservation mode, the computer-executable instructions cause the one or more processors to:
      cause the lighting system to emit light at an average intensity that is higher than the average intensity of light emitted during the plant-growing mode,
      operate the lighting system to emit light according to a second lighting schedule for less time over a period of time than during the plant-growing mode, and
      operate the watering system according to a second watering schedule,
  determine, based on receipt of updated location data from the user device, a second location of the user device that is remote from the plant-growing system; and
  based on a determination that the second location of the user device is less than a second predetermined threshold distance away from the plant-growing system, automatically switch from the plant-preservation mode to the plant-growing mode, wherein the first predetermined threshold distance is greater than the second predetermined threshold distance-.

18. A method comprising:
  operating a plant-growing system in a plant-growing mode, wherein the plant-growing mode comprises:
    operating a lighting system coupled to the plant-growing system according to a first lighting schedule, and
    operating a watering system according to a first watering schedule,
  wherein the watering system is configured to store and deliver liquid to a planting system, wherein the watering system can store a quantity of liquid at an in between a maximum and a minimum quantity,
  wherein the planting system is configured to hold a plurality of plants in a plurality of vertical columns, and
  wherein the lighting system comprises at least one light source configured to emit light;
  determining, based on receipt of location data from a user device, a first location of the user device that is remote from the plant-growing system;
  determining, a location of the plant-growing system;
  based on a determination that the first location of the user device is greater than a first predetermined threshold distance away from the location of the plant-growing system, automatically switching from the plant-growing mode to a plant-preservation mode to reduce plant growth, wherein the plant-preservation mode comprises:
    causing the lighting system to emit light at an average intensity that is higher than the average intensity of light emitted during the plant-growing mode,
    operating the lighting system to emit light according to a second lighting schedule for less time over a period of time than during the plant-growing mode, and
    operating the watering system according to a second watering schedule,
  determining, based on receipt of updated location data from the user device, a second location of the user device that is remote from the plant-growing system; and
  based on a determination that the second location of the user device is less than a second predetermined threshold distance away from the plant-growing system, automatically switching from the plant-preservation mode to the plant-growing mode, wherein the first predetermined threshold distance is greater than the second predetermined threshold distance.

19. The method of claim 18, wherein the first lighting schedule and second lighting schedule each comprise a plurality of lighting periods, wherein each lighting period of the plurality of lighting periods is associated with a particular duration of time and a particular duty cycle over which to activate the lighting system during the particular duration of time, and wherein the first lighting schedule and second lighting schedule each indicate a light intensity associated with each lighting period of the plurality of lighting periods.

20. The method of claim 18, wherein the first watering schedule and second watering schedule each comprise a plurality of watering periods, wherein each watering period of the plurality of watering periods is associated with a particular duration of time and a particular duty cycle over which to activate the watering system during the particular duration of time.

* * * * *

UNITED STATES PATENT AND TRADEMARK OFFICE
CERTIFICATE OF CORRECTION

| | |
|---|---|
| PATENT NO. | : 12,048,277 B2 |
| APPLICATION NO. | : 17/304822 |
| DATED | : July 30, 2024 |
| INVENTOR(S) | : Francois-Xavier Rouxel |

Page 1 of 1

It is certified that error appears in the above-identified patent and that said Letters Patent is hereby corrected as shown below:

In the Specification

Column 19, Line 15, delete "and or" and insert -- and/or --.

Column 26, Line 57, delete "that that" and insert -- that --.

Column 32, Line 28, delete "device" and insert -- device. --.

Column 36, Line 53, delete "device" and insert -- device. --.

Column 40, Line 57, delete "device" and insert -- device. --.

In the Claims

Column 48, Line 5, Claim 17, delete "distance-." and insert -- distance. --.

Signed and Sealed this
Seventh Day of January, 2025

Derrick Brent
*Acting Director of the United States Patent and Trademark Office*